United States Patent [19]

Amano et al.

[11] Patent Number: 4,523,284

[45] Date of Patent: Jun. 11, 1985

[54] METHOD OF CONTROLLING INTERNAL COMBUSTION ENGINE

[75] Inventors: Matsuo Amano; Shinichi Sakamoto, both of Hitachi; Masayuki Miki, Katsuta; Takao Sasayama, Hitachi; Seiji Suda, Mito; Yasunori Mouri; Toshio Ishii, both of Katsuta, all of Japan

[73] Assignee: Hitachi, Ltd., Tokyo, Japan

[21] Appl. No.: 218,671

[22] Filed: Dec. 22, 1980

[30] Foreign Application Priority Data

Dec. 25, 1979 [JP]  Japan ................... 54-169919

[51] Int. Cl.³ ............... G06F 15/20; G05B 15/02; F02B 3/12; F02D 5/02
[52] U.S. Cl. ................... 364/431.12; 73/204; 123/480; 364/734
[58] Field of Search ............ 364/431.04–431.12, 364/734; 73/116, 204; 123/480, 486

[56] References Cited

U.S. PATENT DOCUMENTS

| | | | |
|---|---|---|---|
| 3,835,819 | 9/1974 | Anderson, Jr. ................... | 123/480 |
| 4,199,812 | 4/1980 | Klötzner et al. ............... | 364/431.05 |
| 4,257,377 | 3/1981 | Kinugawa et al. ............... | 123/480 |
| 4,276,600 | 6/1981 | Hartford et al. ................ | 364/431.06 |
| 4,276,601 | 6/1981 | Tokuda et al. .................. | 364/431.05 |
| 4,280,189 | 7/1981 | Takato et al. .............. | 364/431.12 X |
| 4,297,881 | 11/1981 | Sasayama et al. ................ | 73/116 X |
| 4,311,042 | 1/1982 | Hosoya et al. ................ | 73/204 X |
| 4,347,570 | 8/1982 | Akiyama et al. .............. | 364/431.04 |

OTHER PUBLICATIONS

Lancaster: Effects of Engine Variables on Turbulence in a Spark-Ignition Engine Society of Automotive Engineers, Paper #76159, Feb. 1976.

*Primary Examiner*—Felix D. Gruber
*Attorney, Agent, or Firm*—Antonelli, Terry & Wands

[57] ABSTRACT

A method of controlling an internal combustion engine employs a microcomputer to control the fuel supply to the engine as well as the ignition timing thereof on the basis of measurement of the air quantity fed to the engine. For measuring the air quantity charged to the engine with high accuracy, the intake air flow fed to the engine is sampled in synchronism with the pulsating variation thereof. A value obtained by averaging the sampled values is used as the intake air quantity on the basis of which the fuel supply and the ignition timing are arithmetically determined.

45 Claims, 27 Drawing Figures

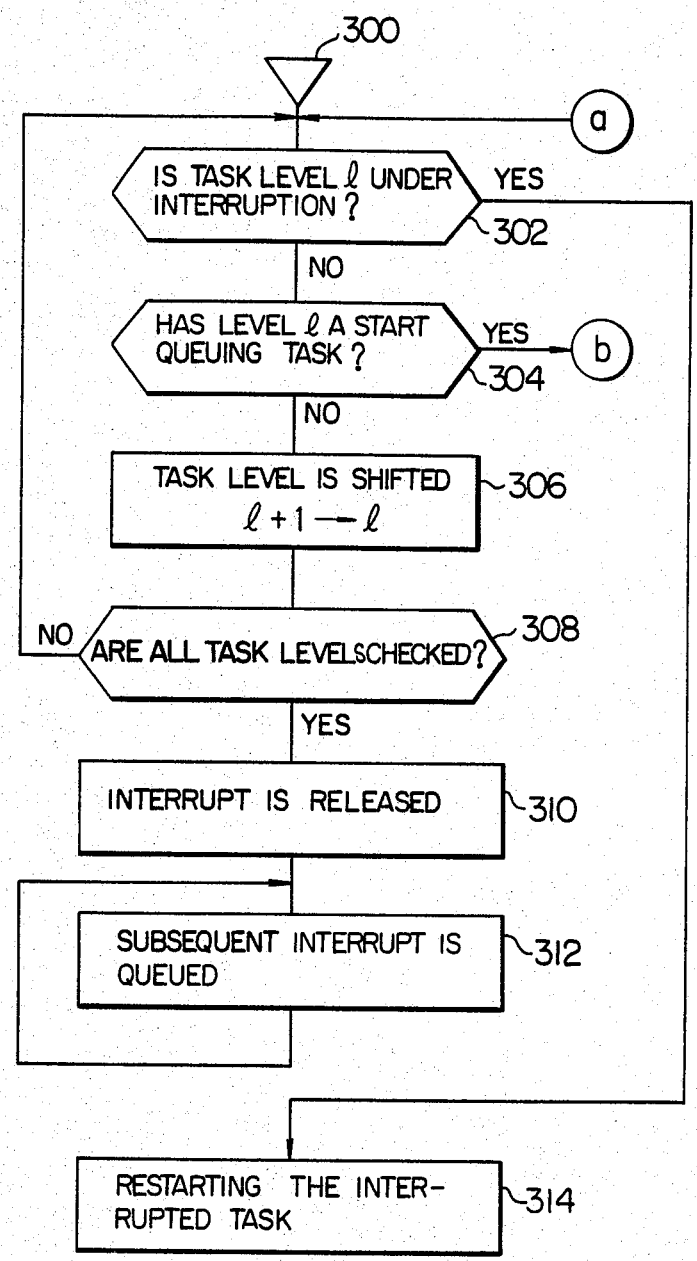

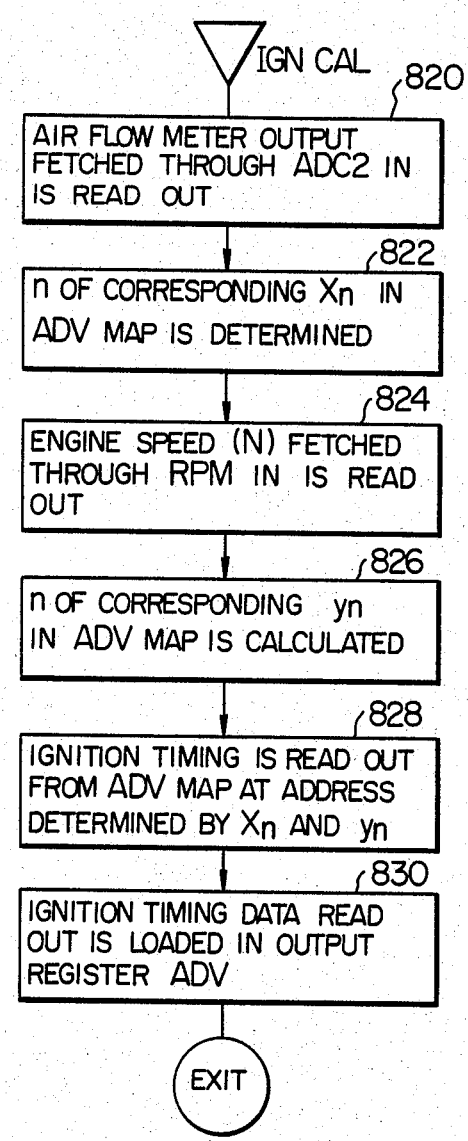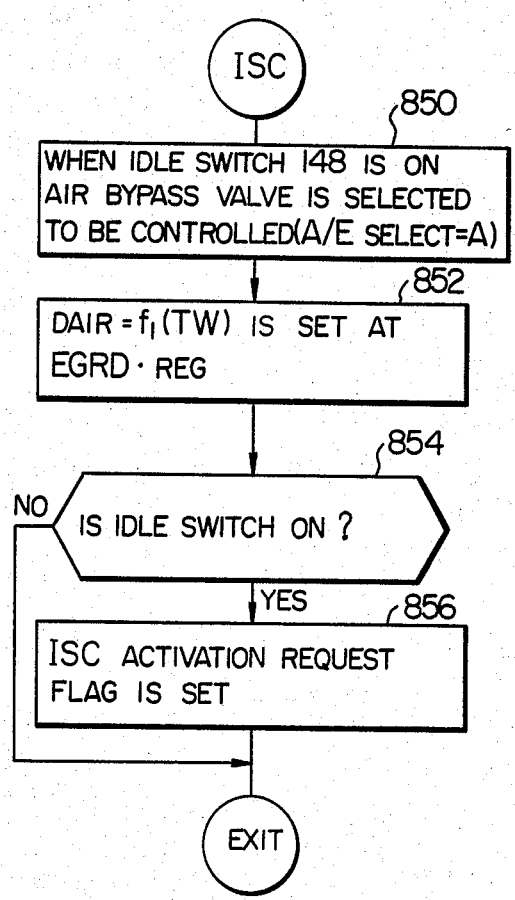

FIG. 24

| | RAM 106 |
|---|---|
| A A A 1 | N |
| 2 | QA OLD |
| 3 | QA NEW |
| 4 | $(v1)^2$ |
| 5 | $(v2)^2$ |
| 6 | $(v3)^2$ |
| 7 | $(v4)^2$ |
| 8 | $(v5)^2$ |
| 9 | $\{(v1)^2\}^2$ |
| A | $\{(v2)^2\}^2$ |
| B | $\{(v3)^2\}^2$ |
| C | $\{(v4)^2\}^2$ |
| D | $\{(v5)^2\}^2$ |
| E | TW |
| F | TA |
| A A B 0 | VR |
| 1 | QTH |
| 2 | $\lambda$ |
| 3 | ANALOG COUNTER |
| 4 | MODE NUMBER |

FIG. 25

| | ROM 102 |
|---|---|
| A A C 1 | 1600 |
| 2 | 3200 |
| 3 | 36 |
| 4 | 72 |
| 5 | 144 |

METHOD OF CONTROLLING INTERNAL COMBUSTION ENGINE

FIELD OF THE INVENTION

The present invention relates to a method of controlling an internal combustion engine. In more particular, the invention relates to a method of controlling the internal combustion engine (hereinafter also referred to simply as the engine) of a motor vehicle with the aid of a microcomputer.

BACKGROUND OF THE INVENTION

In recent years, comprehensive engine control based on the use of a micro-computer has been increasingly adopted with a view to enhancing control functions for engine operations.

As is well known in the control of motor vehicles, the control functions required for controlling the engine operations will vary in dependence on the types of the motor vehicles as well as the purposes which are to be accomplished with the applied control. Under the circumstances, there is a great demand, in view of the need for economy and enchanced controllability, for such a microcomputer-based engine control system which allows common software to be employed for activating the engine control system independently of the types of the motor vehicles and applications which the control system is to serve and, in addition, which allows the control function to be modified, altered or even additionally corrected in accordance with alterations of the motor vehicle and control purpose.

Heretofore, the quantity of suction or intake air fed to the engine has been in most cases, detected by using a hot-wire type air flow sensor in view the relative inexpensiveness thereof. In this connection, it has to be noted that the intake air flow does not remain constant but undergoes pulsating variations. Further, the output signal available from the hot-wire type air flow sensor has a non-liniear relation to the actual quantity of suction air flow, in addition to the fact that the air flow sensor exhibits a rapid response or high sensitivity to variations in the intake air flow. As a consequence, the output signal from the hot-wire type air flow sensor does not necessarily represent the actually drawn in air quantity with an acceptable accuracy. It should further be pointed out that the software design is, as a whole, very complicated and difficulties have heretofore been encountered in modifying the software in dependence on the types of motor vehicles and/or in accordance with alterations in applications.

SUMMARY OF THE INVENTION

Accordingly, an object of the present invention is to provide a method of controlling the operation of an internal combustion engine in response to the quantity of air drawn into the engine with a high accuracy.

According to an aspect of the invention, a timing for sampling an intake air quantity is determined in synchronism with variations in the intake air flow fed to the engine, whereby the instantaneous intake air quantity or flow is measured in the timing thus determined. On the basis of a plurality of instantaneous intake air quantities thus obtained, the quantity of intake air to be actually fed to the engine is arithmetically determined to thereby produce a corresponding control signal. With such an arrangement, the engine operation can be controlled with a high accuracy.

In a preferred embodiment of the invention, the software or program employed for controlling the engine operation may be divided into a subprogram for determining the intake air quantity, a subprogram for arithmetically determining a fuel supply to the engine and so forth in accordance with the functional features of the control to be executed, wherein the subprograms can be activated independently of one another to facilitate modifications and alterations of the software.

DESCRIPTION OF THE DRAWINGS

The present invention will now be described in greater detail by way of example with reference to the accompanying drawings, in which:

FIGS. 8 and 9 are flow charts showing a processing flow of the task dispatcher;

FIG. 19 is a flow chart of the program IGNCAL;

FIG. 20 is a flow chart to illustrate details of a program ISC;

FIG. 24 is a diagram showing data areas of the RAM;

FIG. 25 is a diagram showing data areas of the ROM relating to the operation illustrated in the flow chart of FIG. 23;

DETAILED DESCRIPTION

Figure 1:
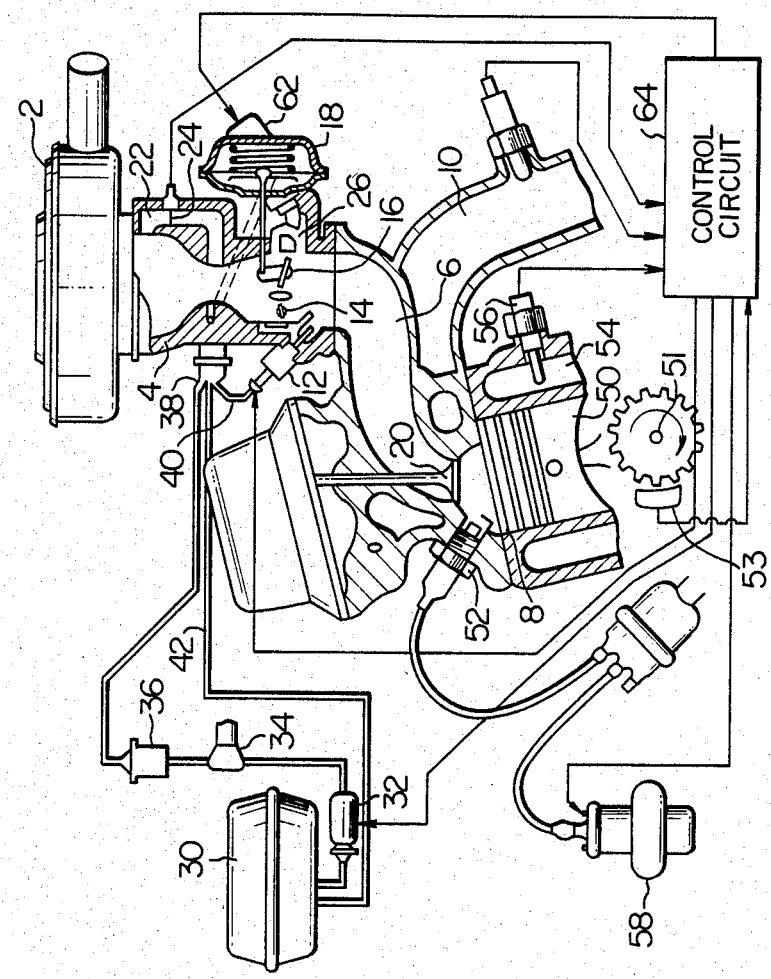
FIG. 1 is a constructional view showing a control apparatus for the whole overall engine system.

Referring to FIG. 1, suction air is supplied to a cylinder 8 through an air filter 2, a throttle chamber 4 and a suction pipe 6. Combustion products in the cylinder 8 are emitted therefrom into the atmosphere through an exhaust pipe 10.

The throttle chamber 4 is provided with an injector 12 for injection fuel. The jet of fuel supplied from the injector 12 is atomized within an air passage of the throttle chamber 4 and is mixed with the suction air, to form a mixture. This mixture passes through the suction pipe 6, and is supplied to a combustion chamber of the cylinder 8 upon opening of an inlet valve 20.

Throttle valves 14 and 16 are arranged near the jet of the injector 12. The throttle valve 14 is constructed so as to be mechanically interlocked with an accelerator pedal operated by a driver. On the other hand, the throttle valve 16 is operated by means of a diaphragm 18. It is fully closed in a region in which the rate of flow of air is low. As the rate of flow of air increases, vacuum pressure on the diaphragm 18 increases, whereby the throttle valve 16 begins to open so as to suppress an increase in the suction resistance.

Upstream of the throttle valves 14 and 16 of the throttle chamber 4, an air passage 22 is provided. An electric heating element 24 in the form of a hot-wire type air flowmeter is arranged in the air passage 22, to provide an electric signal varying as a function of pulsation-like variation in the air flow as determined on the basis of the relationship between the velocity of air flow and the quantity of heat transfer of the heating element. Since the heating element 24 is arranged within the air passage 22, it is protected from a high-temperature gas which is produced at the backfire of the cylinder 8, and it is also protected from being affected by dust in the suction air. The outlet of the air passage 22 opens in the vicinity of the narrowest part of a Venturi tube, and the inlet thereof opens into the upper stream side of the Venturi tube.

The fuel to be fed to the injector 12 is supplied from a fuel tank 30 to a fuel pressure regulator 38 through a fuel pump 32, a fuel damper 34 and a filter 36. The pressurized fuel is supplied from the fuel pressure regulator 38 to the injector 12 through a pipe 40. The fuel is returned from the fuel pressure regulator 38 to the fuel tank 30 through a return pipe 42 so that the difference between the pressure of the suction pipe 6 into which the fuel is injected from the injector 12 and the pressure between the inlet and outlet of the injector 12 be constant at all times.

The mixture sucked in from the suction valve 20 is compressed by a piston 50, and is ignited by a spark produced across the electrodes of an ignition plug 52. Thermal energy resulting from the combustion is converted into kinetic energy. The cylinder 8 is cooled with cooling water 54, the temperature of which is measured by a water temperature sensor 56, the measured value being utilized as an engine temperature. The ignition plug 52 is supplied with a high voltage from an ignition coil 58;

A crank shaft 51 is provided with a crank angle sensor 53 which provides a reference angle signal and a position signal for every reference crank angle (e.g. 180 degrees) and every fixed angle (e.g., 0.5 degrees) respectively, as the engine is rotated.

The outputs of the crank angle sensor, the output of the water temperature sensor 56 and the electric signal from the heating element 24 are supplied to a control circuit 64 including a microcomputer, and are operated and processed by the control circuit 64. The injector 12 and the ignition coil 58 are operated by outputs from the control circuit 64.

In the engine system which is controlled on the basis of the above construction, the throttle chamber 4 is provided with a bypass passage 26 which is shunted across the throttle valve 16 of the throttle chamber and communicates with the suction pipe 6. The bypass passage 26 is provided with a bypass valve 62 the opening degree of which is controllable. The control of the bypass valve 62 is carried out in response to a control input supplied to the associated driving means from the control circuit 64.

The bypass valve 62 is caused to face the bypass 26 arranged around the throttle valve 16, and is controlled by a pulse current so as to open or close. This bypass valve 62 functions to vary the cross-sectional area of the bypass 26 through the magnitude of the lift of the valve. The magnitude of the lift is controlled in such a manner that a driving system is driven by an output of the control circuit 64. The control circuit 64 generates an opening-and-closing period signal in order to control the driving system, and on the basis of the opening-and-closing period signal, the driving system gives the driving portion of the bypass valve 62 the control signal for regulating the magnitude of the lift of the bypass valve 62.

Figure 2:
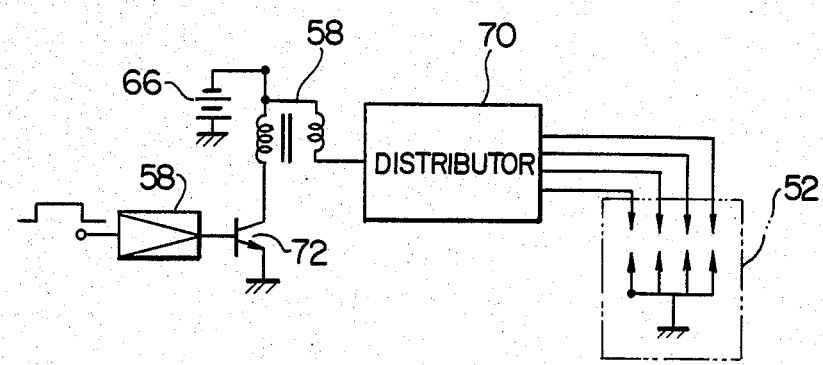
FIG. 2 is a circuit diagram of the ignition device shown in FIG. 1.

Referring now to FIG. 2, a pulse current is supplied to a power transistor 72 through an amplifier 68, the transistor 72 being turned "on" by this current. A current thus flows through the primary winding of the ignition coil 58 from a battery 66. The transistor 72 is turned "off" upon disappearance of this pulse current, resulting in induction of a high voltage in the secondary winding of the ignition coil 58.

The high voltage is distributed through a distributor 70 to the ignition plugs 52 arranged in the respective cylinders of the engine, in synchronism with the engine rotation.

Figure 3:
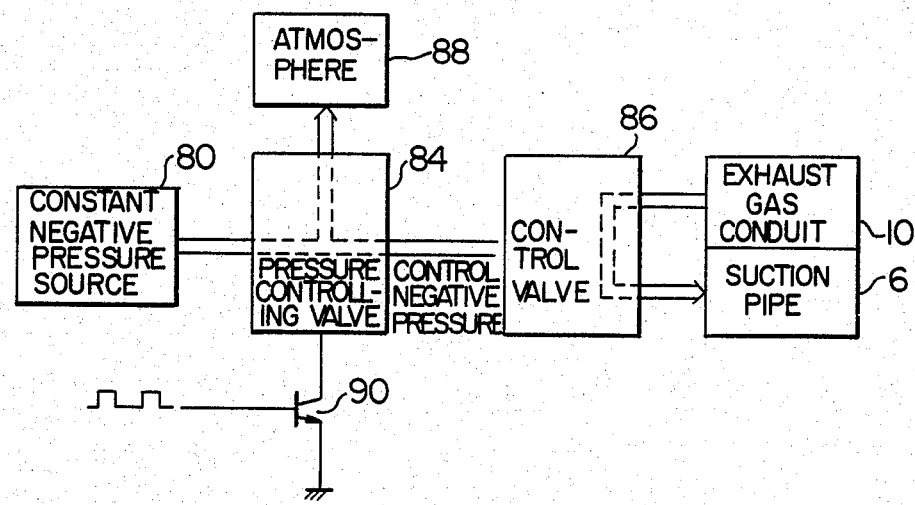
FIG. 3 is a block diagram for illustrating an exhaust gas recirculating system.

FIG. 3 illustrates an exhaust gas recirculation system (hereinafter referred to as an "EGR" system). A fixed sub-atmospheric pressure of a vacuum pressure source 80 is applied to a controlling valve 86 through a pressure control valve 84. The pressure control valve 84 controls the state of the application of the sub-atmospheric pressure to the controlling valve 86 by controlling the proportion of releasing the sub-atmospheric pressure of the vacuum pressure source into the atmosphere 88 in accordance with the duty ratio of recurrent pulses applied to the base electrode of a transistor 90. Accordingly, the vacuum to be applied to the controlling valve 86 is determined by the duty ratio of the transistor 90. The EGR quantity from the exhaust pipe 10 to the suction pipe 6 is controlled by the controlled vacuum pressure of the pressure determining valve 84.

Figure 4:
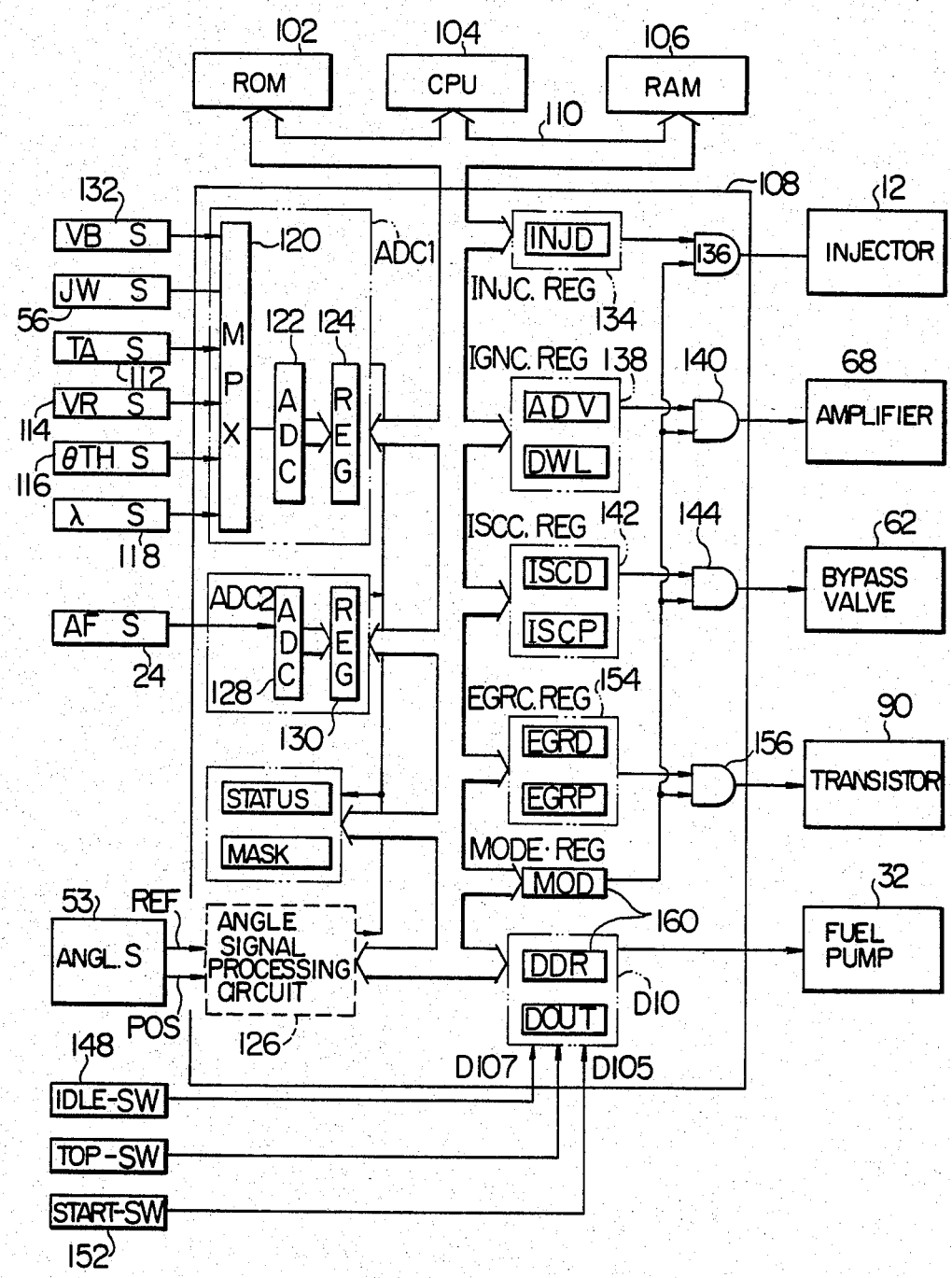
FIG. 4 is a general block diagram of an engine control system.

Referring to FIG. 4, the control system consists of a CPU 104, a read only memory 102 (hereinafter referred to as a "ROM"), a random access memory 106 (hereinafter referred to as a "RAM"), and input/output circuitry 108. The CPU 104 processes input data from the input/output circuitry 108 and couples the operated results back to the input/output circuitry 108 in accordance with various programs stored in the ROM 102. Intermediate storage necessary for these operations makes use of the RAM 106. The exchanges of various data among the CPU 104, the ROM 102, the RAM 106 and the input/output circuitry 108 are performed by a bus line 110 which consists of a data bus, a control bus and an address bus.

The input/output circuitry 108 has the input means of a first analog-to-digital converter (hereinafter written "ADC1"), a second analog-to-digital converter (hereinafter written "ADC2"), an angle signal processing circuit 126, and a discrete input/output circuit (hereinafter written "DIO") for receiving and delivering 1-bit information.

In the ADC1, outputs from a battery voltage detecting sensor 132 (hereinafter written "VBS"), the cooling water temperature sensor 56 (hereinafter written "TWS"), an atmospheric air temperature sensor 112 (hereinafter written "TAS"), a regulated voltage generator 114 (hereinafter written "VRS"), a throttle angle sensor 116 (hereinafter written "θTHS", and a λ-sensor 118 (hereinafter written "λS") are supplied to a multiplexer 120, and one of them is selected by the MPX 120 and applied to an analog-to-digital converter circuit 122 (hereinafter written "ADC"). A digital value which is an output of the ADC 122 is stored in a register 124 (hereinafter written "REG").

An output from the flow rate sensor 24 (hereinafter written "AFS") is applied to the ADC2 and is converted through an analog-to-digital converter circuit 128 (hereinafter written "ADC") into a digital value, which is set in a register 130 (hereinafter written "REG").

An angle sensor 146 (hereinafter written "ANGS") provides a signal indicative of a reference crank angle, for example, 180-degree crank angle (hereinafter written "REF") and a signal indicative of a small angle, for example, 1-degree crank angle (hereinafter written "POS"). The signals are applied to the angle signal processing circuit 126 to be properly shaped.

The DIO receives outputs from an idle switch 148 (hereinafter written "IDLE‘SW"), a top gear switch 150 (hereinafter written "TOP-SW") and a starter switch 152 (hereinafter written "START-SW").

There will now be described pulse output circuits and controlled systems which are based on the operated results of the CPU. An injector control circuit (written "INJC") is a circuit which converts the digital value of the operated result into a pulse output. Accordingly, a pulse which has a pulse width corresponding to the quantity of the fuel to be injected is prepared by the INJC 134 and is applied to the injector 12 through an AND gate 136.

An ignition pulse generator circuit 138 (hereinafter written "IGNC") has a register (written "ADV") in which the ignition timing is set, and a register (written "DWL") in which the time of energization of the ignition coil is set. These data are sent from the CPU. Pulses are generated on the basis of the set data, and are applied through an AND gate 140 to the amplifier 68 described in detail with reference to FIG. 2.

The valve opening degree of the bypass valve 62 is controlled by pulses which are applied to the valve driving means from a control circuit (hereinafter written "ISCC") 142 through an AND gate 144. The ISCC 142 has a register ISCD which sets a pulse width and a register ISCP which sets a recurrent pulse period.

An EGR quantity control pulse-generator circuit 154 (hereinafter written "EGRC") for controlling the transistor 90 which in turn controls the EGR controlling valve 86 shown in FIG. 3 has a register EGRD in which a value representative of the duty ratio of the pulses is set and a register EGRP in which a value representative of the recurrent period of the pulses is set. The output pulses of the EGRC are applied to the base electrode of the transistor 90 through an AND gate 156.

Input/output signals each of 1 bit are controlled by the circuit DIO. As the input signals, there are the IDLE-SW signal, the TOP-SW signal and the START-SW signal. As the output signal, there is a pulse output signal for driving the fuel pump. The DIO is provided with a register DDR for determining whether terminals are to be used as input terminals or as output terminals, and a register DOUT for latching output data.

A register 160 is a register (hereinafter written "MOD") which holds instructions for various states inside the input/output circuitry 108. For example, by setting an instruction in this register, all the AND gates 136, 140, 144 and 156 are turned "on" or turned "off". By setting instructions in the MOD register 160 in this manner, the stops and starts of the outputs of the INJC and the IGNG or ISCC can be controlled.

Figure 5:
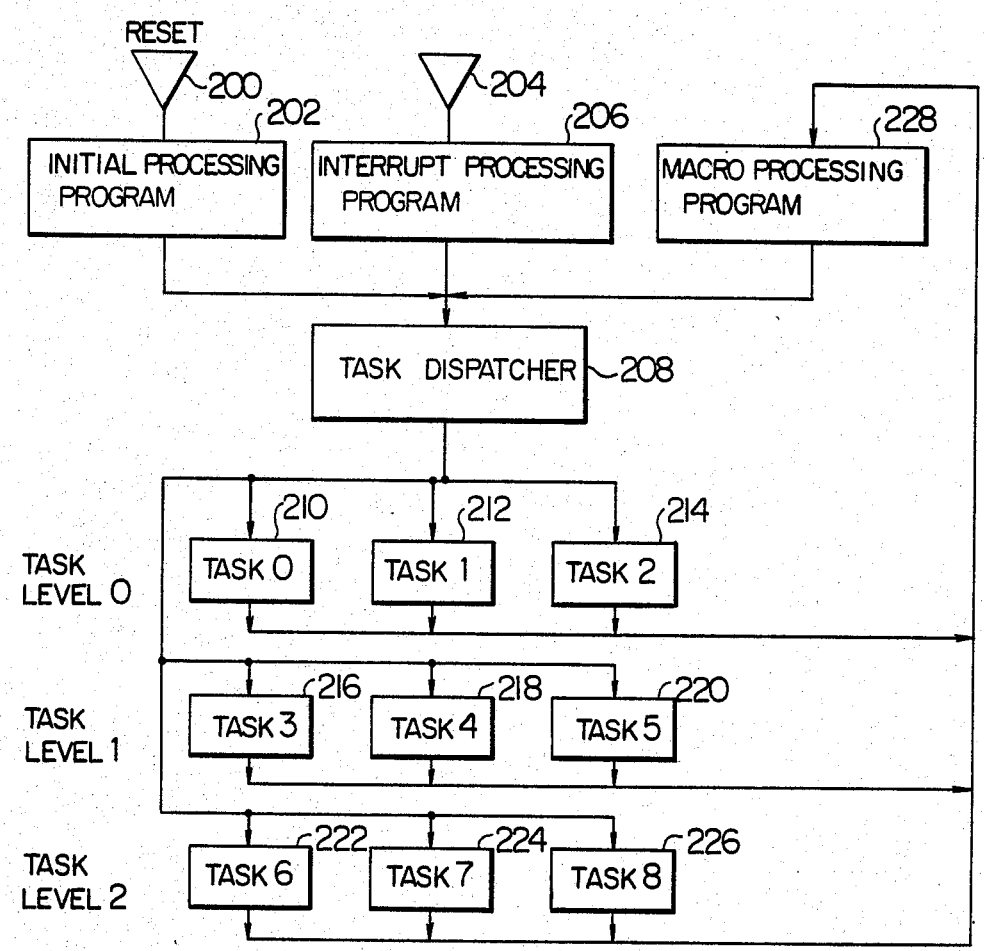
FIG. 5 is a block diagram showing a fundamental arrangement of a program system according to a preferred example of the engine control method according to the invention.

Referring to FIG. 5, an initial processing program 202, an interrupt processing program 206, a macro processing program 228 and a task dispatcher 208 are executive programs for managing a group of tasks. The initial processing program 202 is a program for executing pre-processings for actuating a micro-computer. By way of example, it clears the stored content of the RAM 106 and sets the initial values of the registers of the input/output interface circuitry 108. Further, it executes processings for loading input information for carrying out pre-processings necessary for the engine control, for example, the data of the cooling water temperature $T_w$, or the battery voltage. The interrupt processing program 206 accepts various interrupts, analyzes the interrupt factors, and gives the task dispatcher 208 a start request for starting a required task among the group of tasks 210 to 226. As will be stated later, the interrupt factors include an AD conversion interrupt (ADC) which generates the input information of the supply voltage, or the cooling water temperature after completing the AD conversions, an initial interrupt (INTL) which is generated in synchronism with the rotation of the engine, an interval interrupt (INTV) which is generated every preset constant time, for example, 10 ms, an engine stalling interrupt (ENST) which is generated upon detecting the stop state of the engine, and so on.

The respective tasks in the group of tasks 210 to 226 are assigned task numbers representative of priority levels, and they belong to any of task levels "0" to "2". That is, the tasks 0 to 2 belong to the task level "0", those 3 to 5 belong to the task level "1", and those 6 to 8 belong to the task level "2".

The task dispatcher 208 receives the start requests of the various interrupts, and allots the occupying times of the CPU on the basis of the priority levels given to the various tasks corresponding to these start requests.

The priority control of the tasks by the task dispatcher 208 conforms with the following method:

(a) The transfer of the right of run to a task of a higher priority by interrupting a task of a lower priority is made only among the task levels. It should be noted that the level "0" has the highest priority.

(b) In the case where, within an identical task level, there is a task being run or has been interrupted, the particular task has the highest priority, and any other task cannot be operated until the particular task ends.

(c) In the case where, within an identical task level, there are start requests for a plurality of tasks, a smaller task number has a higher priority.

While the processing contents of the task dispatcher 208 will be described later, the system is designed to perform the above priority control so that soft timers may be provided in the RAM task-wise, while control blocks for managing the tasks are set in the RAM task level-wise. When the execution of each task has ended, the end of execution of the particular task is reported to the task dispatcher 208 by the macro processing program 228.

Figure 6:
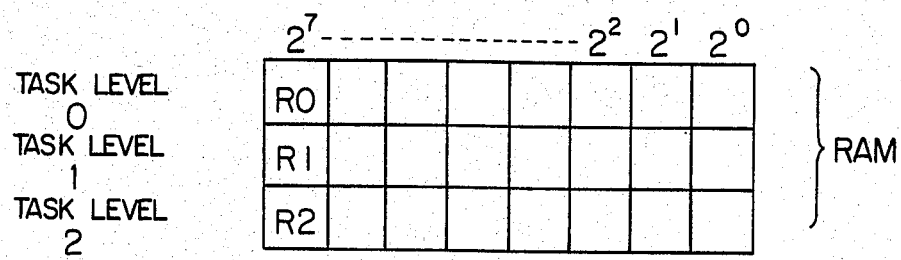
FIG. 6 is a diagram showing a table of task control blocks which are provided in a RAM controlled by a task dispatcher.

The processing contents of the task dispatcher 208 will now be described with reference to FIGS. 6 to 12. FIG. 6 shows the task control blocks provided in the RAM which the task dispatcher 209 manages. The task control blocks are provided in accordance with the number of the task levels, i.e. there are three task control blocks in correspondence with the task levels "0", "1" to "2", respectively. Eight bits are allotted to each control block. Among them, bits 0 to 2 ($Q_0$–$Q_2$) are start bits which indicate a start request task, and bit 7 (R) is a run bit which indicates if any task within the same task level is being executed or has been interrupted. The start bits $Q_0$ and $Q_2$ are arranged in a sequence in which the execution priority is higher in the corresponding task level. By way of example, the start bit for task 4 in FIG. 5 is $Q_1$ of task level "1". In the case where the start requests of the tasks have been made, flags are raised in any of the start bits. On the other hand, the task dispatcher 208 retrieves the issued start requsts successively from the start bit corresponding to the task of higher level, resets the flags corresponding to the issued start requests and also raises flags "1" at the run bits, and executes processing operations for starting the particular task.

Figure 7:
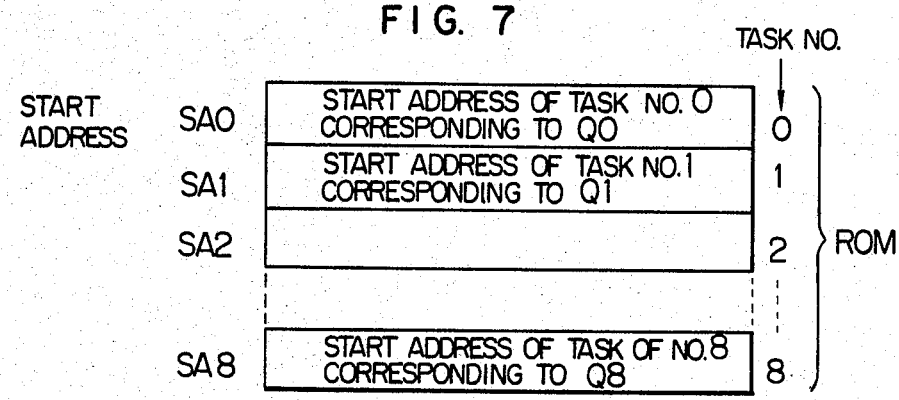
FIG. 7 is a diagram showing a start address table for a group of tasks which are caused to start by various interrupts.

Referring to FIG. 7 which shows a start address table provided in the RAM 106 which is managed by the task dispatcher 208, start addresses SA0 to SA8 correspond to the respective tasks 0 to 8 in the group of tasks 210 and 226 shown in FIG. 5. Sixteen bits are allotted for each start address. As will be mentioned later, these start addresses are used for starting the tasks for which the start requests have been made by the task dispatcher 208.

Figure 9:
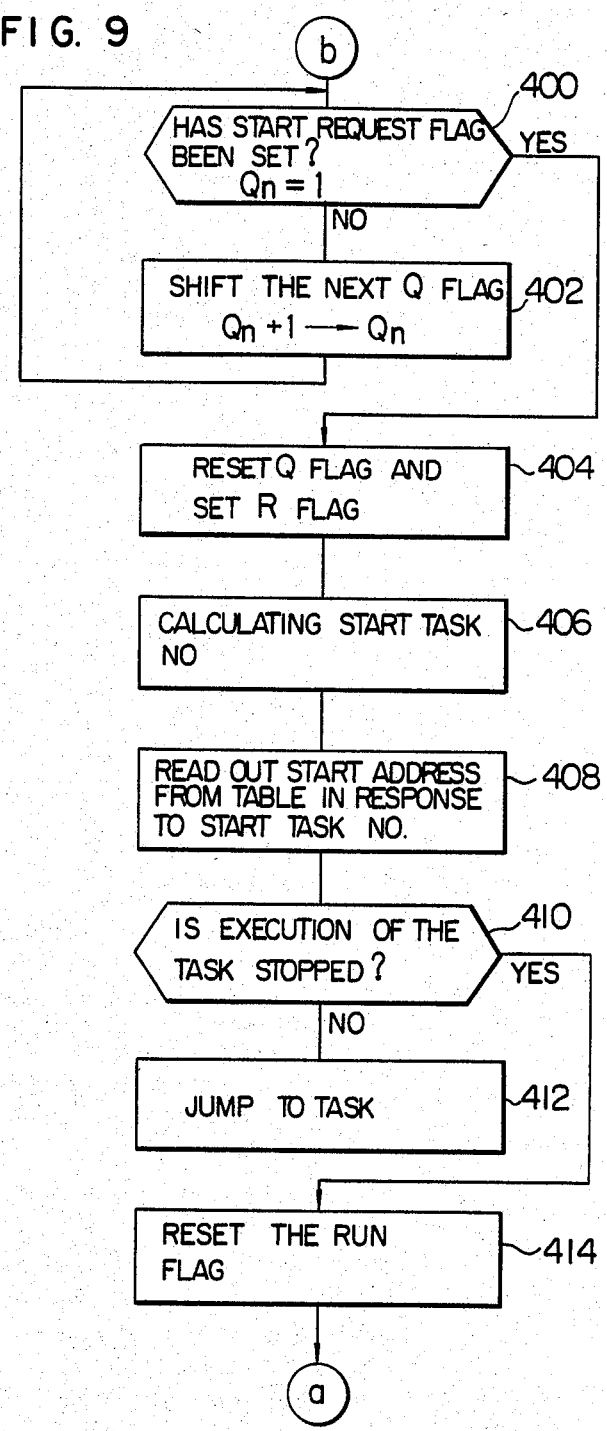

Referring to FIGS. 8 and 9, when the processing of the task dispatcher has been started in a step 300; whether or not the execution or run of a task belonging to task level l is under interruption is decided in a step 302. More specifically, a "1" in the run bit signifies a state in which the task completion report is not yet issued to the task dispatcher 208 by the macro processing program 228 and in which the task that was under execution has been interrupted because of the occurrence of an interrupt of a higher priority level. Accordingly, if the flag "1" is in the run bit, the flow jumps to a step 314 so as to restart the interrupt task.

In contrast, in the case where the flag "1" is not in the run bit, that is, the run indicating flat is reset, the flow shifts to a step 304 so as to decide whether or not a start queuing task exists at the level l. That is, the start bits of the level l are retrieved in the sequence of the higher execution or run priority degrees of the corresponding tasks, namely, in the sequence of $Q_0$, $Q_1$ and $Q_2$. In the case where the flage "1" is not in the start bits belonging to the task level 1, the flow shifts to a step 306 so as to renew the task level. That is, the task level l is incremented +1 into (l+1). When the renewal of the task level has been performed in the step 306, the flow shifts to a step 308 so as to decide whether or not all the task levels have been checked. In the case where all the task levels have not been checked, that is, l≠2, the flow returns to the step 302, and the processing operations are similarly carried out by the above procedure. In the case where all the task levels have been checked in the step 308, the flow shifts to a step 310 to release the interrupt. The interrupt release is made in this step because the interrupt is inhibited during the processing period of the steps 302 to 308. In the next step 312, the subsequent interrupt is placed in the queue.

Now, in the case where a start queuing task exists at the task level l in the step 304, that is, in the case where the flag "1" is in the start bit belonging to the task level l, the flow shifts to a step 400. By means of a loop of steps 400 and 402, which of the start bits of the task level l has the flag "1" is retrieved in the sequence in which the corresponding execution priorities are higher, namely, in the sequence of $Q_0$, $Q_1$ and $Q_2$. When the particular start bit has been found, the flow shifts to a step 404. In the step 404, the start bit at which the flag is raised is reset, and the flag "1" is set in the run bit (hereinafter, termed "R bit") of the particular task level l. Further, in a step 406, the start task number is deduced, and in a step 408, the start address information of the corresponding start task is fetched by means of the start address table provided in the RAM as shown in FIG. 7.

Subsequently, in a step 410, whether or not the corresponding start task is to be executed is determined. If the fetched start address information is a specified value, for example, 0 (zero), it is determined that the corresponding task need not be executed. This decision step is necessary for affording the functions of only specified tasks selectively in dependence on the types of cars among the group of tasks for performing the engine control. In the case where, in the step 410, it has been determined that the execution of the corresponding task is to be terminated, the flow shifts to a step 414 so as to reset the R bit of the particular task level l. Further, the flow returns to the step 302, and whether or not the task level l is under interruption is determined. Since there can be a case where flags are raised at a plurality of start bits within the same task level l, the flow shifts to the step 102 after resetting the R bit in the step 414.

In contrast, in the case where, in the step 410, execution of the particular task is not to be terminated but is to continue, the flow shifts to a step 412 and jumps to the particular task, whereupon the task is executed.

Figure 10:
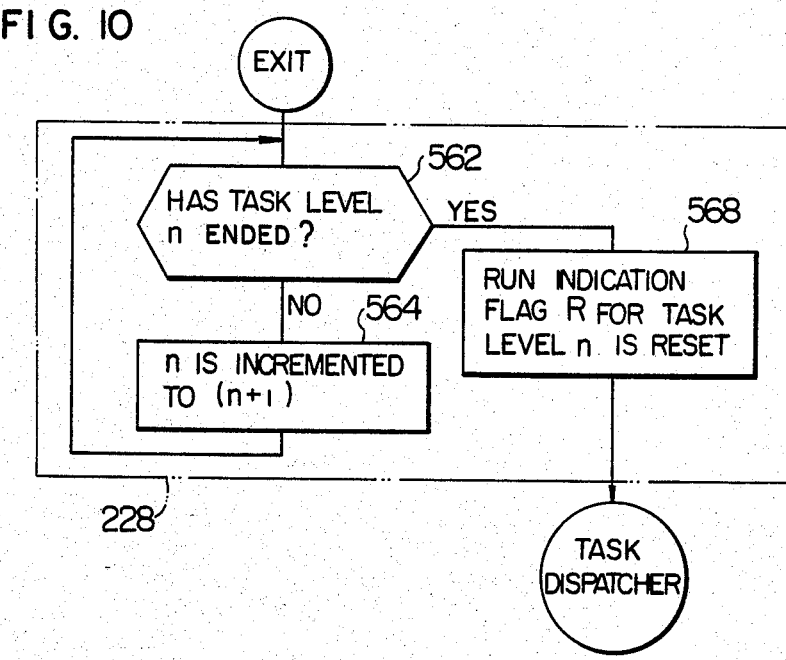
FIG. 10 is a flow chart showing a processing flow of a macro processing program.

Referring to FIG. 10, the macro processing program 228 consists of steps 562 and 564 for finding the end task. In the steps 562 and 564, task levels are retrieved from "0" and the task level having been completed is found. Thereafter, the flow proceeds to a step 568, in which the execute (RUN) flag of the seventh bit of the task control block of the task having ended is reset. Thus, execution of the task has been completed. The flow returns to the task dispatcher 208 again, and the next task to be run is determined.

Figure 11:
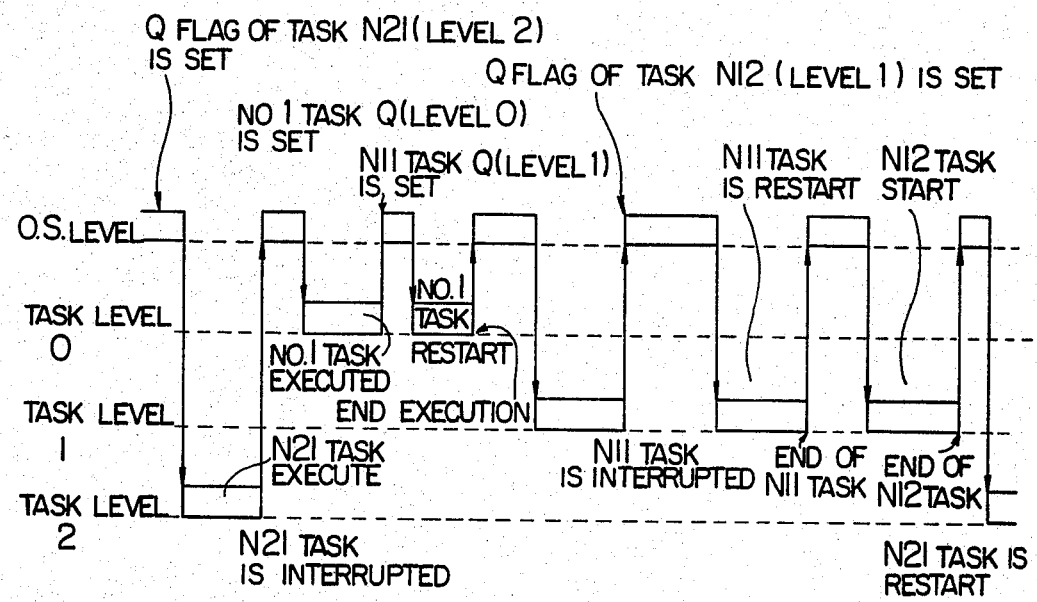
FIG. 11 is a diagram showing an example of a task priority control.

The appearances of the run and interrupt of tasks in the case where the task priority control is made by the task dispatcher 208 will not be described with reference to FIG. 11. Here, m in the start request $N_{mn}$ denotes the task level, and n denotes the level of the priority degree in the task level m. Let it be assumed that the CPU has run an executive program OS. Then, in the case where a start request $N_{21}$ has occurred during the execution of the executive program OS, the executin of a task corresponding to the start request $N_{21}$ or the task 6 is started at a time $T_1$. In the case where, during the execution of the task 6, a start request $N_{01}$ for a task of higher run priority has occurred at a time $T_2$, the execution shifts to be executive program OS and the predetermined processing operations already described are executed, whereupon the execution of a task corresponding to the start request $N_{01}$ or the task 0 is started at a time $T_3$. In the case where, during the execution of the task 0, a start request $N_{11}$ has further entered at a time $T_4$, the execution once shifts to the executive program OS and the predetermined processing operations are executed, whereupon the execution of the task 0 having been interrupted is restarted at a time $T_5$. When the execution of the task 0 has ended at a time $T_6$, the execution shifts to the executive program OS again. Here, the completion of execution of the task 0 is reported to the task dispatcher 208 by the macro processing program 228. At a time $T_7$, the execution of the task 3 corresponding to a start request $N_{11}$ having queued is started again. In the case where, during the execution of the task 3, a start request $N_{12}$ of lower priority in the same task level 1 has entered at a time $T_8$, execution of the task 3 is once interrupted. The execution shifts to the executive program OS and the predetermined processings are performed, whereupon the execution of the task 3 is restarted at a time $T_9$. When the execution of the task 3 has ended at a time $T_{10}$, the execution of the CPU shifts to the executive program OS, and the completion of execution report of the task 3 is supplied to the task dispatcher 208 by the macro processing program 228. Subseqently, the execution of the task 4 corresponding to a start request $N_{12}$ of lower priority level is started at a time $T_{11}$. When the execution of the task 4 has ended at a time $T_{12}$, the execution shifts to the executive program OS to perform the predetermined processing operations, and thereafter, the execution of the task 6 having been interrupted until then and corresponding to the start request $N_{21}$ is restarted at a time $T_{13}$.

In the above manner, the priority control of the tasks is executed.

Figure 12:
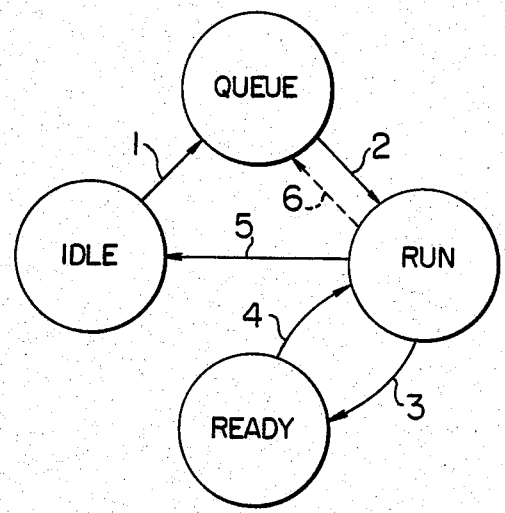
FIG. 12 is a diagram illustrating state transistions of tasks in the task priority control.

The transition states in the priority control of the tasks are shown in FIG. 12. An "Idle" state is the start queuing state, in which any start request has not yet been issued for a task. When a start request is subsequently issued, a flag is set in the start bit of the task control block so as to indicate that the start is necessary. The periods of time in which the "Idle" state moves to a "Queue" state are determined depending upon the levels of the respective tasks. The sequence decision is further carried out in the "Queue" state and depends upon the priority degree. The particular task acquires into the "Run" state after the flag of the start bit of the task control block has been reset by the task dispatcher 208 in the executive program OS and the flag has been raised at the R bit (seventh bit). Thus, the execution of the task is initiated. When the execution has ended, the flag of the R bit of the task control block is cleared, and an execution completion report is finished. Then the "Run" state ends, and the "Idle" state begins again, issuance of the next start request being awaited. However, when an interrupt IRQ has occurred during the execution of the task, the particular task must be interrupted. Therefore, the contents of the CPU are shunted, and the execution is interrupted. This state is a "Ready" state. When a state in which the task is execution again has subsequently begun, the contents having been shunted are returned to the CPU from the shunt area, and execution is restarted. That is, the "Ready" state returns to the "Run" state again. In this manner, each level program repeats the four states in FIG. 12. FIG. 12 shows typical flows, but there is the possibility that a flag will be set in the start bit of the task control block in the "Ready" state. This corresponds to, for example, a case where a start request timing next to the particular task has been reached in the course of the start interrupt. At this time, priority is given to the flag of the R bit, and the task which has been interrupted is first completed. Thus, the flag of the R bit disappears, and the "Queue" state is established by the flag of the start bit without passing through the "Idle" state.

Figure 13:
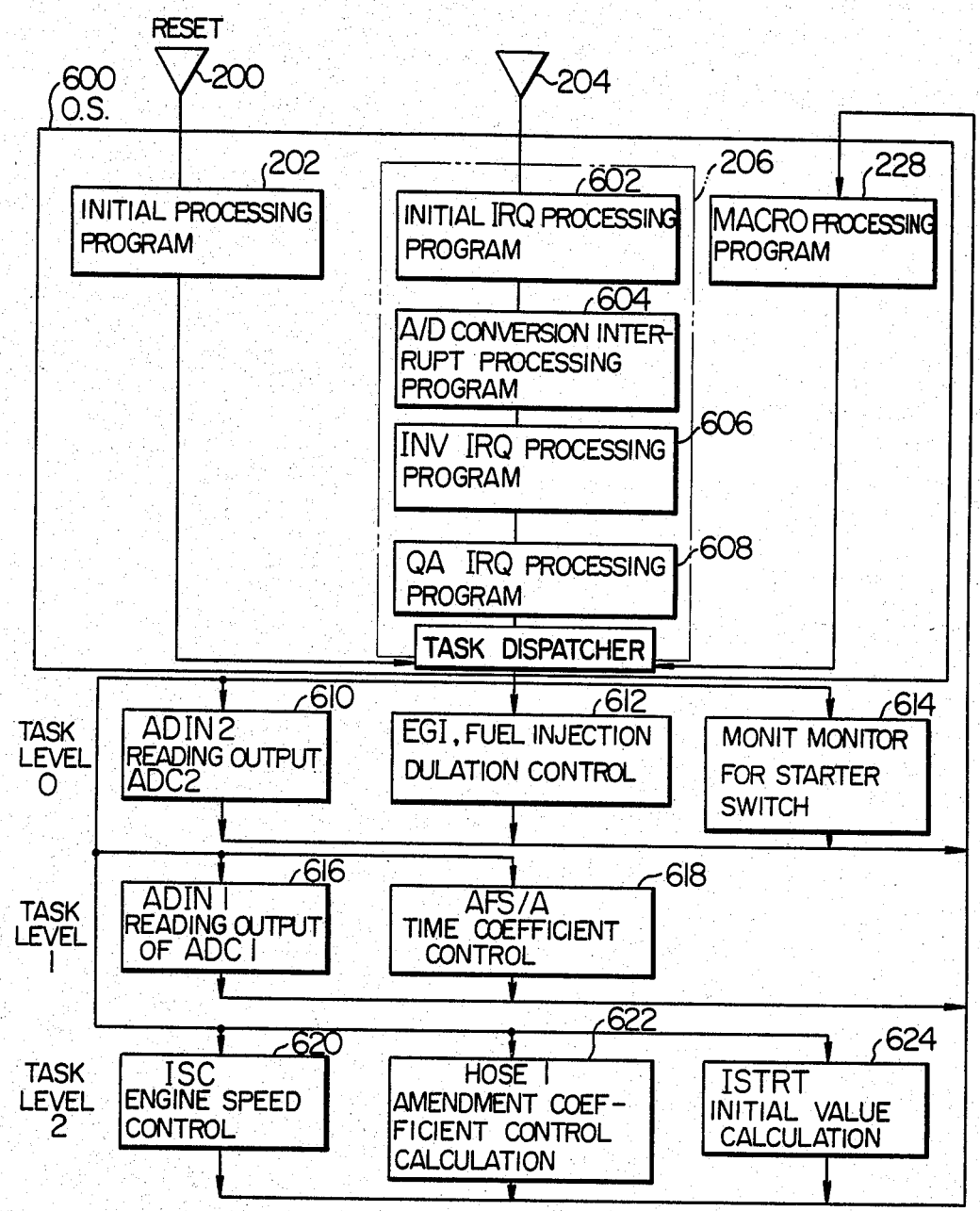
FIG. 13 is a block diagram showing an embodiment in FIG. 5.

Referring to FIG. 13, the executive program OS consists of the initial processing program 202, the interrupt processing program 206, the task dispatcher 208 and the macro processing program 228.

The interrupt processing program 206 includes various interrupt processing programs. An initial interrupt processing (hereinafter, termed "INTL interrupt processing") program 602 is such that initial interrupts take place at half the number of the cylinders of the engine (that is, twice for four cylinders) per revolution of the engine by means of initial interrupt signals which are generated in synchronism with the rotation of the engine. By the initial interrupt, the injection time of fuel calculated in an EGI task 612 is set in the EGI register of the input/output interface circuitry 108. An AD conversion interrupt processing 604 includes two types, which are the AD converter 1 interrrupt (hereinafter, abbreviated to "ADC1") and the AD converter 2 interrupt (hereinafter, abbreviated to "ADC2"). The AD converter 1 has a precision of 8 bits, and is used for the inputs of the supply voltage, the cooling water temperature, the suction temperature, and the service adjustment. It starts the conversion at the same time that the input point to the multiplexer 120 is designated, and it generates the ADC1 interrupt after completing the conversion. This interrupt is used only before starting the engine or cranking. On the other hand, the AD converter 128 is employed for the input of the air flow rate, and it generates the AD2 interrupt after completing the conversion. This interrupt is also used only before starting the engine or cranking.

In an interval interrupt processing program (hereinafter, indicated as "INTV interrupt processing program") 606, an INTV interrupt signal is generated every pulse stored in the INTV register, for example, 10 ms and is used as a fundamental signal for monitoring the time of a task to be started at a fixed period. With this interrupt signal, the soft timer is restarted, and a task having reached the prescribed period is started. Further, in an engine stalling interrupt processing program (hereinafter, written "ENST interrupt processing program") 608, the stop state of the engine is detected. Upon detecting the INTL interrupt signal, counting is started. When the INTL interrupt signal has not been subsequently detected within a predetermined time, for example, 1 second, stopping of the engine is detected through the associated software. When it is determined that the engine has stalled, the power supply to the ignition coil and the operation of the fuel pump are stopped. After these processing operations, the control is awaited until the starter switch 152 turns "on". A outline of the processing operations for the above interrupt factors is indicated in Table 1.

the task level 2, are an idle rotation control task (hereinafter, written "ISC task"), an amendment calculation task (hereinafter, written "HOSEI task") and a start pre-processing task (hereinafter, written "ISTRT task").

The allotment of the various task levels and the functions of the tasks are listed in Table 2.

TABLE 2

Allotment of Task Levels and Functions of Tasks

| Level | Designation of Program | Task No. | Functions | Start Period |
|---|---|---|---|---|
| 0 | OS | | Engine rotation interrupt control | at least 5 ms |
| 1 | | | Other OS processing operations | |
| 0 | ADIN2 | 0 | AD converter 2 input, calibration, filtering, Acceleration control | The task is started upon INITIAL IRQ for fetching output from ACD2 in synchronism with Q4 IRQ |
| | | | Input, calibration and filtering of engine revolution speed Fuel cut | Activated every 10 ms. |
| | EGI | 1 | Fuel injection time control CO adjustment | Activated every 20 ms |
| | MONIT | 3 | Monitor of starter switch (OFF) Fuel injection time control at start Start and stop of soft timer | Activated every 40 ms |
| 1 | ADIN1 | 4 | AD converter 1 input, calibration, filtering | Activated every 50 ms |
| | AFSIA | 6 | After-start, after-idle, after-acceleration time coefficient control | Activated every 120 ms |
| 2 | ISC | 8 | Idle revolution number control | Activated every 200 ms |
| | HOSEI | 9 | Amendment coefficient calculation | Activated every 300 ms |
| | ISTRT | 11 | EGI initial value calculation Monitor of starter switch (ON) Start and stop of soft timer Fuel pump, I/O LSI start | Activated every 30 ms |

TABLE 1

Outline of Processing Operations for Interrupt Factors

| Designation of Interrupt Factor | Outline of Processing |
|---|---|
| INTL | (1) The fuel injection time is set in the EGI register. (2) The occurrence is made use of as the timing for starting the sampling of the output from the air flow sensor. |
| ADC1 | Task ADIN1 is started. |
| ADC2 | Task ADIN2 is started. |
| INTV | The start periods of tasks ADIN2, EGI, MONIT, ADIN1, AFSIA and ISC to be started at fixed periods are checked, and the tasks having reached the prescribed periods are started. |
| QA | This interrupt designates the timing for sampling the output from the air flow sensor. The output from AD2 is fetched. |

Regarding the initial processing program 202 and the macro processing program 228, the processing operations as already stated are executed.

The group of tasks which are started by the various interrupts are as follows. The tasks belonging to the task level 0, are an AD2 input task (hereinafter, written "ADIN2 task"), a fuel injection control task (hereinafter written "EGI task") and a start monitor task (called "MONIT task"). The tasks belonging to the task level 1, are an AD1 task (hereinafter, written "ADIN1 task") and a time coefficient processing task (hereinafter, termed "AFSIA task"). Further, the tasks belonging to As will be apparent from Table 2, the start periods of the tasks to be started by the various interrupts are determined in advance. This information is kept stored in the ROM 102.

Figure 14:
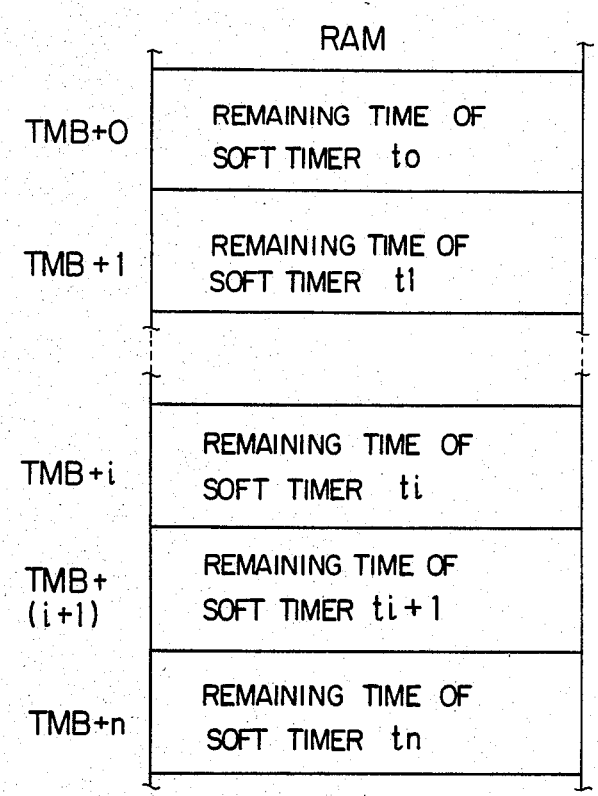
FIG. 14 is a diagram showing a soft timer table provided in the RAM.

The INTV interrupt processing will now be described with reference to FIGS. 14 to 16. FIG. 14 shows a soft timer table provided in the RAM 106. This soft timer table is provided with timer blocks equal in number to the different start periods to be started by the various interrupts. The "timer blocks" signify memory areas to which time information on the start periods of the tasks stored in the ROM 104 are transmitted. TMB signifies the first address of the soft timer table in the RAM 106. The time information on the start period (in the case where the INTV interrupt is performed at every period of, for example, 10 ms), is transmitted to and stored in each timer block of the soft timer table from the ROM 104 at the start of the engine.

Figure 15:
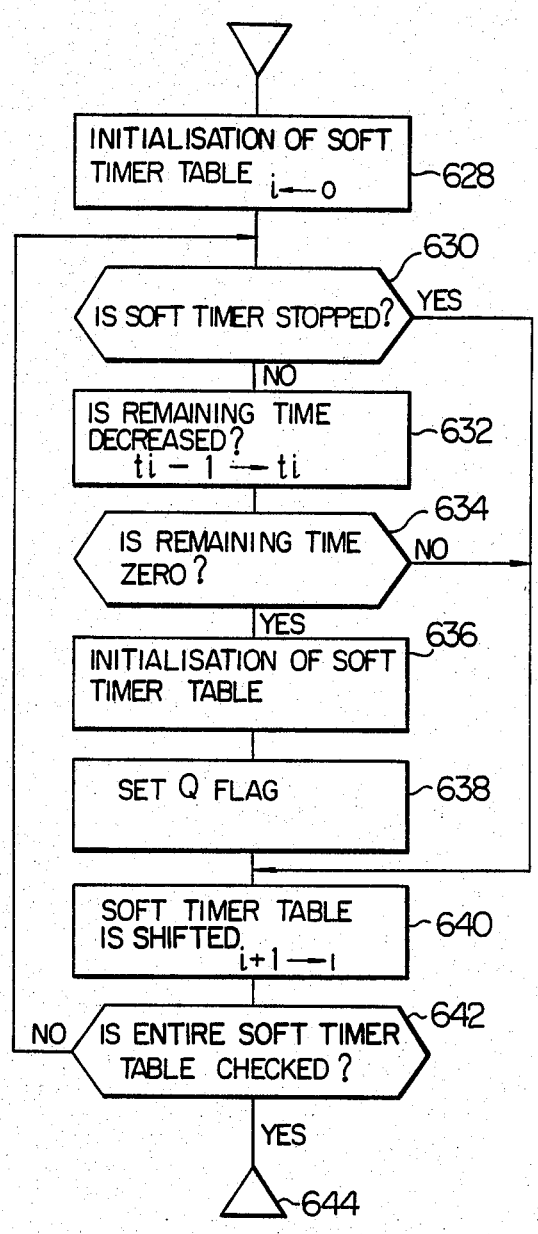
FIG. 15 is a flow chart showing a processing flow of an INTV interrupt processing program.
Figure 16:
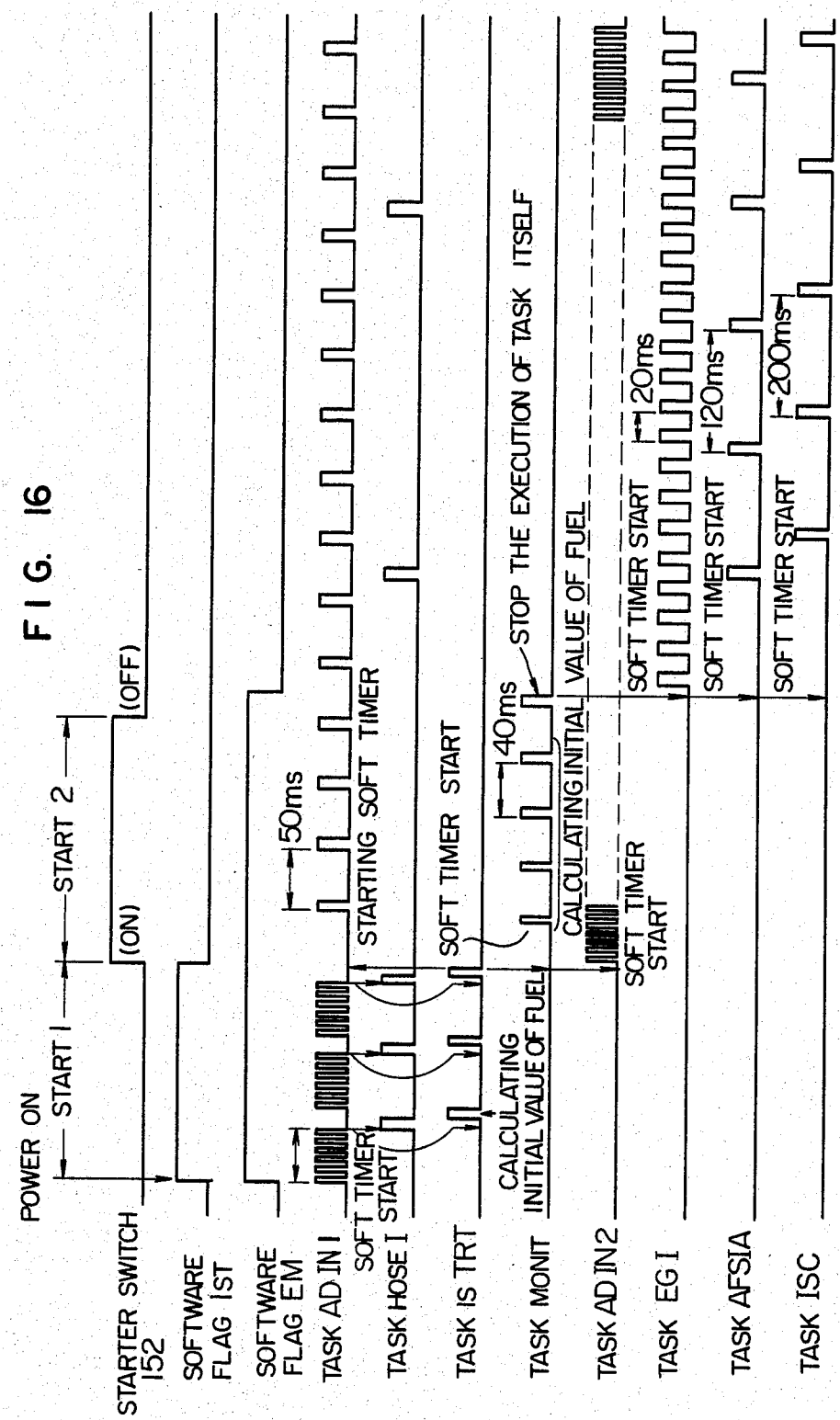
FIG. 16 is a waveform diagram showing a situation in which the starting and stopping operations of various tasks are performed independence on the operating state of an engine.

FIG. 15 shows a flow chart of the INTV interrupt processing 606. When the program has been started in a step 626, the soft timer table provided in the RAM 106 is initialized in a step 628. That is, the content i of the index register is made 0 (zero), and the remaining time $T_i$ stored in the timer block of address TMB+0 of the soft timer table is checked. $T_i = T_0$ holds in this case. Subsequently, in a step 630, whether or not the soft timer examined in the step 628 has been stopped is decided. More specifically, in the case where the remaining time $T_i$ stored in the soft timer table is $T_i = 0$, it is decided that the soft timer has been stopped, it is decided that the particular task to be started by the soft timer has been stopped, and the flow jumps to a step 640 so as to renew the soft timer table.

In contrast, in the case where the remaining time $T_i$ of the soft timer table is $T_i \neq 0$, the flow shifts to a step 632, in which the remaining time of the timer block is renewed. The remaining time is decremented ($-1$) from $T_i$. Subsequently, in a step 634, it is decided whether or not the soft timer of the timer table has reached the start period. More specifically, in the case where the remaining time $T_i$ is $T_i = 0$, it is decided that the start period has been reached, and the flow shifts to a step 636 in that case. On the other hand, in the case where it is decided that the soft timer has not reached the start period, the flow jumps to the step 640 so as to renew the soft timer table. In the case where the soft timer table has reached the start period, the remaining time $T_i$ of the soft timer table is initialized in the step 636. That is, the time information of the start period of the particular task is transmitted from the ROM 102 to the RAM 106. After the remaining time $T_i$ of the soft timer table has been initialized in the step 636, the start request for the task corresponding to the soft timer table is made in a step 638. Subsequently, in the step 640, the soft timer table is renewed. That is, the content of the index register is renewed. That is, the content of the index register is incremented (+1). Further, in a step 642, whether or not all the soft timer tables have been checked is decided. Since the (N+1) soft timer tables are provided in the present embodiment as shown in FIG. 14, the check of all the soft timer tables is decided to have ended in the case where the content i of the index register is i=N+1. In this case, the INTV interrupt processing program 606 ends in a step 644. In contrast, in the case where it has been decided in the step 642 that all the soft timer tables have not been checked, the flow returns to the step 630 and the same processings as above stated are performed.

In the above manner, the start request for the particular task is issued in accordance with the various interrupts, and the run of the particular task is done on the basis of the request. However, all the tasks listed in Table 2 are not always run. On the basis of the operating information of the engine, the time information on the start period of any of the group of tasks provided in the ROM 102 is selected, and it is transmitted to and stored in the soft timer table of the RAM 106. Assuming by way of example that the start period of the given task is 20 ms, the task is started every time. If the start of the task needs to be continuously performed in dependence on the operating conditions, the soft timer table corresponding to the particular task is renewed and initialized at all times. Now, the situation in which the group of tasks are started and stopped by the various interrupts in accordance with the operating conditions of the engine will be described with reference to a waveform diagram shown in FIG. 16. When power is turned "on" by actuating the started switch 152, the CPU 104 operates, and "1" is set up at a software flag IST and a software flag EM. The software flag IST is a flag indicating that the engine is in the start before starting, while the software flag EM is a flag for inhibiting the ENST interrupt. From the position of these two flags, it is possible to determine whether the engine is ready for starting, being started, or has been started. When the power "on" state has been established by actuating the starter switch 152, the tasks ADIN1 is started first of all, and data necessary for starting the engine, for example, input information such as the cooling water temperature and the battery voltage are applied to the AD converter 122 through the multiplexer 120 by means of the various sensors. The task HOSEI is started every cycle of inputs of these data, amendment calculations being performed on the basis of the input information. Every cycle of inputs of the data from the various sensors to the AD converter 122 by the task ADIN1, the task ISTRT is started to calculate the quantity of fuel injection necessary during the starting of the engine. The above three tasks, i.e., task ADIN1, task HOSEI and task ISTRT are started by the initial processing program 202.

When the starter switch 152 has been switched "on", starts are applied to the three tasks of task ADIN1, task MONIT and task ADIN2 by setting the "Q" flags generated by the task ISTRT. ADIN1 and MONIT tasks need to be run only in the period of time in which the starter switch 152 is in the "on" state (during the cranking of the engine). In the period of time, from the ROM 102, the time information of the predetermined start periods are transmitted to and stored in the soft timer tables provided in the RAM 106. In the period of time, the remaining time $T_i$ of the start period of the soft timer table is initialized, and the start period is repeatedly set. The task MONIT is a task for calculating the quantity of fuel injection at the start of the engine, and it is unnecessary after the engine has been started. Therefore, when the run of the task has ended a predetermined number of times, the start of the soft timer is stopped, and the stop signal issued at the task end is used to start the group of other tasks required after the engine has been started. The stop of the task is performed by the soft timer in such a way that "0" is written into the corresponding soft timer table of the task by a signal indicative of the end of the task, in other words, that the content of the soft timer is cleared. It will be appreciated that the present embodiment so far described is designed to carry out the starts and stops of the tasks by means of the soft timers, and hence, it becomes possible to execute an efficient and reliable management for the plurality of tasks having unequal start periods.

Figure 17:
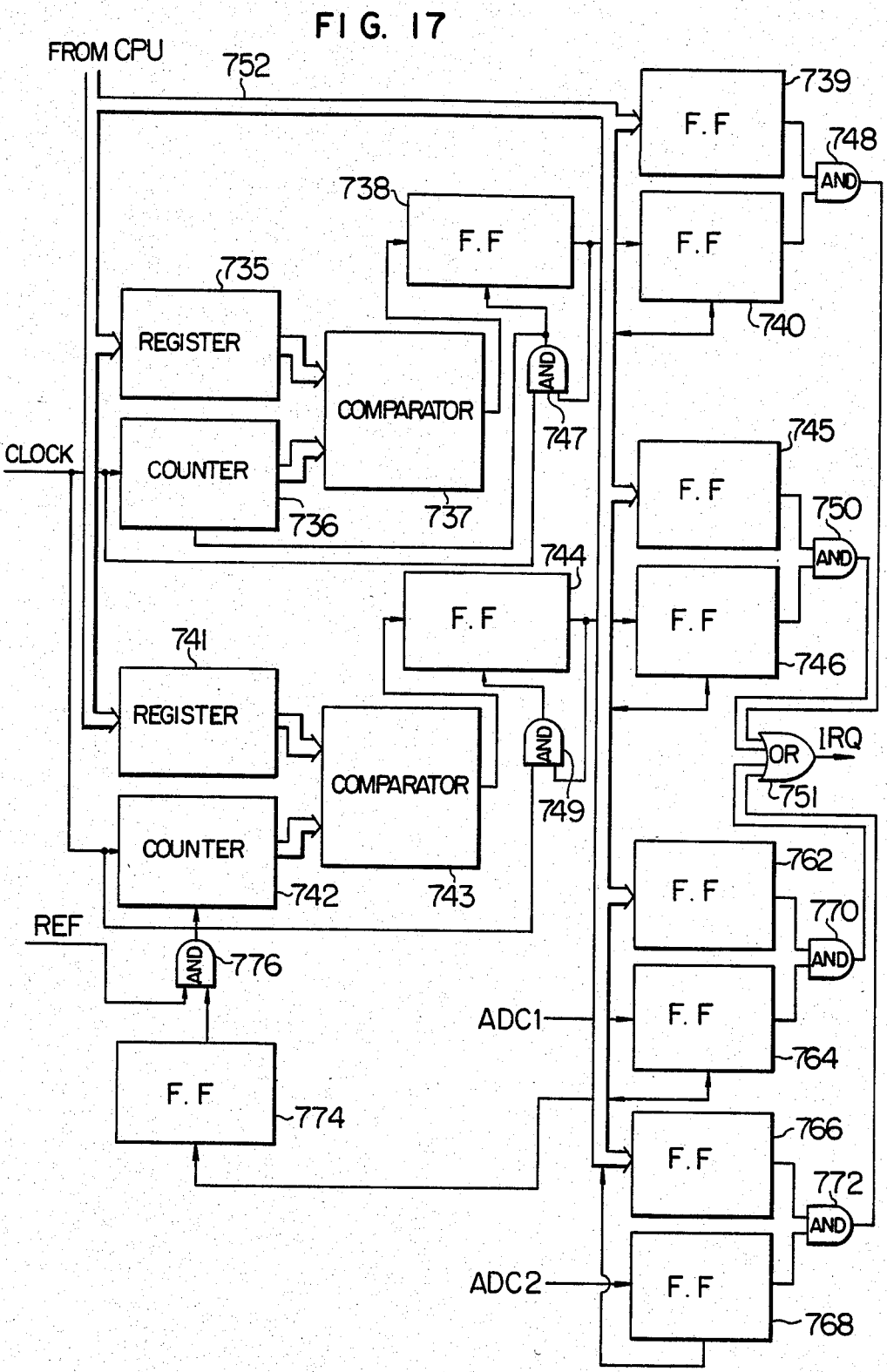
FIG. 17 is a block diagram of a generator circuit for interrupts.

Referring to FIG. 17, an IRQ generator circuit includes a register 735, a counter 736, a comparator 737 and a flip-flop 738 which together constitute a generator circuit for the INTV IRQ. The generation period of the INTV IRQ, for example, 10 ms in the present embodiment is set in the register 735. Clock pulses are set in the counter 736. When the count value of the counter 736 corresponds to the content of the register 735, the flip-flop 738 is brought into the set state. The counter 736 is cleared by the set state, and restarts counting. Accordingly, the INTV IRQ is generated every fixed time (10 msec).

The IRQ generator circuit further includes a register 741, a counter 742, a comparator 743 and a flip-flop 744 which together constitute a generator circuit for the QA IRQ signal which provides an interrupt for inputting QA data generated by the AD2. The register 741 the counter 742 and the comparator 743 are identical with those above, and the QA IRQ is generated when the count value in counter 742 has reached the value of the register 741.

The INTV IRQ generated in the flip-flop 738, the QA IRQ generated in the flip-flop 744, and the IRQ generated in the ADC1 or ADC2 are respectively set in flip-flops 740, 746 and 764 or 768. Signals for generating or inhibiting the IRQs are set in flip-flop 739, 745, 762 and 766. If "H" is set in the flip-flops 739, 745, 762 and 766, AND gates 748, 750, 770 and 772 are enabled. When the IRQ is generated, it is output from an OR gate 751.

Accordingly, depending upon whether "H" or "L" is put into the respective flip-flops 739, 745, 762 and 766, it is possible to inhibit the generation of the IRQ or to release the inhibition. When the IRQ has been generated, the cause for the generation of the IRQ is known by loading the contents of the flip-flops 740, 746, 764 and 768 into the CPU 104.

In the case where the CPU has started to run the program in response to the IRQ, the IRQ signal needs to be cleared, and hence, one of the flip-flops 740, 746, 764 and 768 as concerns the IRQ having begun the run is cleared.

Figure 18:
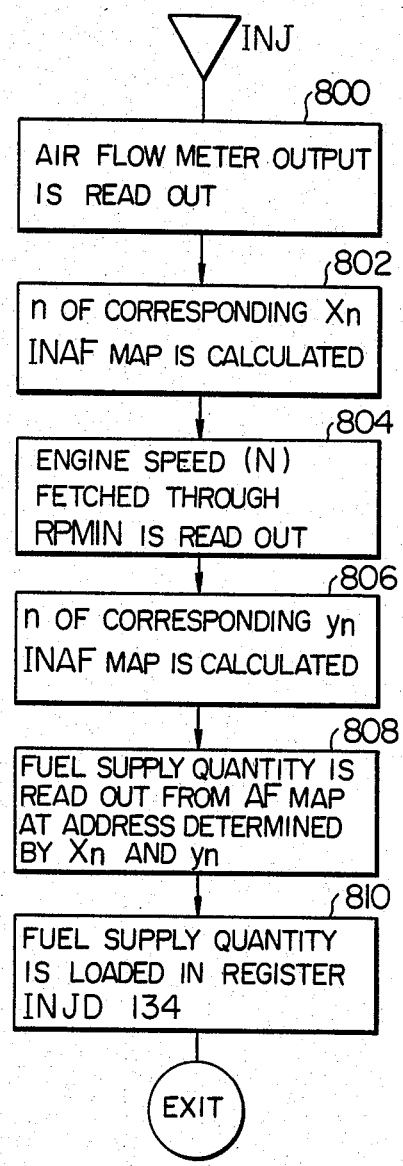
FIG. 18 is a flow chart of INJ program.

FIG. 18 is a flow chart of the INJ program which is activated at a time interval or period of 20 m.sec. At a step 800, the digital value QA representing the output signal from the air flow meter 24 and stored in the RAM 106 through execution of the task ADC2IN after A-D conversion is read out. At a step 802, the actual value of QA read out at a step 800 is compared with QA values set at $x_n$ of AF map provided in ROM 102, thereby to determine n of $x_n$ corresponding to the actual value of QA. At a step 804, the engine speed data N stored in the RAM 106 through execution of the task ADC2IN is read out. At a step 806, the actual value of N as read out is compared with the values of N set at $y_n$ in the AF map, thereby to determine n of $y_n$ corresponding to the actual value of N. At a step 808, an address of the AF map is determined on the basis of $x_n$ and $y_n$ determined at the steps 802, respectively. The quantity of fuel supplied which is stored at the determined address is read out and placed in the register INJD 134 shown in FIG. 4 at a step 810.

FIG. 19 shows a flow chart of the program IGN-CAL. At a step 820, digital value QA representing the output from the air flow meter and stored in the RAM 106 through execution of the program ADC2IN is read out. At a step 822, the actual value of QA as read out is compared with values of QA set at $x_n$ of ADV map provided in the ROM 102, thereby to determine n of $x_n$ which corresponds to the actual value of QA. At a step 824, the engine speed data N stored in the RAM 106 through execution of ADC2IN is read out. At a step 826, the actual value of N as read out is compared with values of N set at $y_n$ of the ADV map thereby to determine n of $y_n$ which corresponds to the actual value of N. At a step 828, an address in the ADV is determined on the basis of $x_n$ and $y_n$ determined at the steps 822 and 826, respectively. At a step 830, the ignition timing stored at the determined address is read out and placed in the register ADV shown in FIG. 4.

The program HOSEI is provided for determining correction coefficients for temperatures of the atmosphere and cooling water, for example. Since these parameters undergo only slow changes, it is sufficient to determine the correction coefficients at a long interval.

Referring now to FIG. 20, program ISC is provided for controlling the opening degree of the air bypass valve 62 when the engine is idling.

When it is determined that the idle switch 148 is turned on by monitoring DIO of FIG. 4 at a step 850, the first bit of the register DOUT is at level "L", whereby the air bypass valve 62 is designated. Thus, the air bypass valve is controlled in dependence on the value placed in the register EGRD of FIG. 4. The air bypass valve 62 serving for controlling the air flow through the bypass passage is controlling in the specific operating conditions. More particularly, in the case of operation at a low ambient temperature such as in winter, starting operation in the cooled state of engine, or operation under large load due to the use of a car air-conditioner, the air flow through the bypass passage is increased.

At a step 852, the duty factor of the air bypass valve is determined and set at the register EGRD in dependence on the temperature of engine cooling water.

At a step 854, it is determined whether the idle switch 148 is closed or not. If the switch is closed, then activation request flag for the program ISC is set at a step 856. In other words, bit "1" is set at Q10 of the task control word TCW10 of the RAM shown in FIG. 16. Simultaneously, the first bit of the register DOUT of DIO 174 is set at level "L".

Subsequently, an end indication is issued.

On the other hand, when the idle switch is opened, and end indication is immediately generated. Accordingly, this program is no longer executed. In this way, when the idle switch is closed at the step 856, the activation request flag for the program ISC is set and then the end indication is generated.

Figure 21:
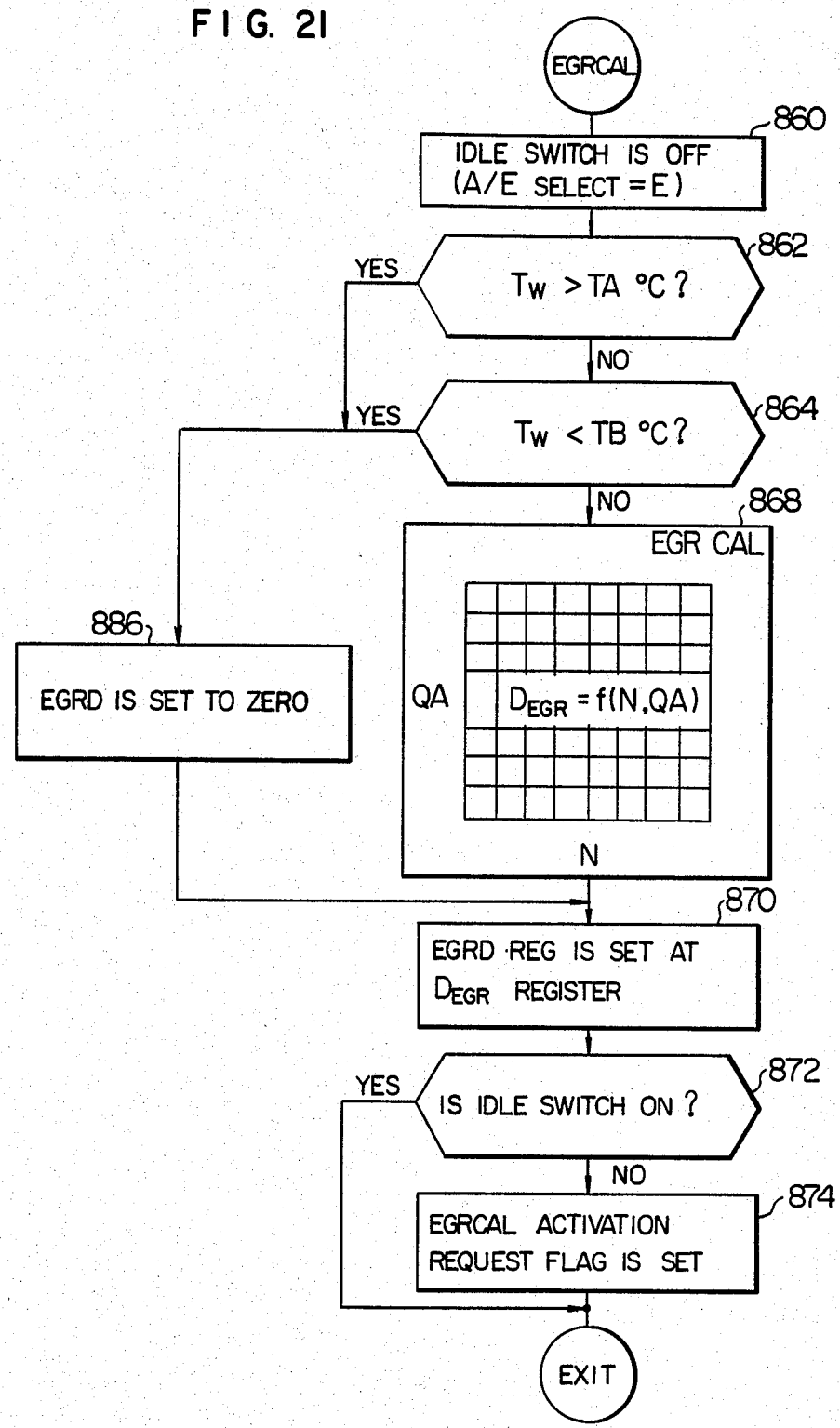
FIG. 21 is a flow chart illustrating details of a program EGRCAL.

FIG. 21 shows a flow chart of the program EGR-CAL. When the idle switch is in the opened state, the air bypass valve 90 is not controlled, but the recirculation of exhaust gas is effected. To this end, the EGR system for controlling the exhaust gas recirculation quantity is driven. For driving the EGR system, the first bit in the register DOUT of D10 is set to the level "H" at a step 860, whereby the EGR system shown in FIG. 3 is driven in accordance with the value set at the register EGRD of FIG. 4. Next, an arithmetic operation for determining the EGR quantity is carried out. At a step 862, it is determined whether the cooling water temperature TW is higher than a predetermined value TA °C. If the answer is affirmative, EGR operation is inhibited or cut. To this end, zero is set at the EGRD register for effecting EGR CUT at a step 866. When the cooling water temperature TW is found to be lower than the predetermined value (TA °C.), the program proceeds to the step 864 where it is determined whether the temperature TW of cooling water is lower than a predetermined value TB °C. If so, then EGR operation is inhibited. To this end, zero is set at the EGRD register at a step 866. The temperature TA at the step 862 represents the upper limit, while the temperature TB at the step 864 represents the lower limit. Only when the temperature TW of the engine cooling water lies in the range between TA and TB, can the EGR operation be carried out. The program proceeds to a step 868 where the EGR quantity is arithmetically determined on the basis of the suction air quantity QA and the revolution number N of the engine through the map retrievals. The map employed for this retrieval is provided in the ROM 102. The retrieved values are set at the register EGRD. In this manner, the valve for EGR is opened in dependence on the value placed in the register EGRD and the duty cycle previously set at the register EGRP, whereby EGR operation is carried out.

At a step 872, it is decided whether the idle switch is in the closed state by monitoring the DIO. When the idle switch is opened, an activation request flag for the program EGRCAL is set. In other words, the bit "1" is set at Q11 of the task control word TCW11 of the RAM. Further, the first bit of the register DOUT of the DIO is set at the level "H".

Next, the processing of a signal output from the hot-wire type air flow sensor according to the invention will be described in some detail only by way of example.

The signal available from the hot-wire type air flow sensor is first sampled in response to the INTL interrupt. The timing for sampling the sensor signal differs in each of three modes which are defined in dependence on the revolution speed of the engine crankshaft. More particularly, referring to FIG. 22, one of the three modes corresponds to the mode 0 in which the revolution speed N of the engine crankshaft is in the range N<1600 r.p.m.; another corresponds to the mode 1 in which the engine crankshaft revolution speed N lies in the range 1600 r.p.m.≦N≦3200 r.p.m.; and the other corresponds to the mode 2 where the engine crankshaft revolution speed N is larger than 3200 r.p.m. on the assumption that the engine is of a four-cylinder type and hence that the crank rotation angle of 180° corresponds to a single suction stroke. In the case of the example being described, the mode 0 is illustrated on the assumption that the revolution speed N is equal to 1600 r.p.m., while the mode 1 is illustrated for the revolution speed N equal to 3200 r.p.m. and the mode 2 is for the revolution speed N which is assumed to be equal to 6400 r.p.m. Accordingly, in the case of the illustrated mode 1, the rotation angle is twice as large as that of the mode 0 for a same period, while in the mode 2, the rotation angle is four times as large as that of the mode 0 and hence twice as large as that of the mode 1.

According to the illustrated example of the invention, five samplings of the air flow sensor signal are performed in the mode 0 for a single suction stroke. In other words, for a single suction stroke, the sampling is effected at every time interval which corresponds to the crankshaft rotation angle of 36° in this mode 0.

In a similar manner, in the case of the mode 1, the sampling of the sensor signal is effected at every time interval which corresponds to the crankshaft rotation angle of 72°, because the revolution speed N in this mode 1 is twice as high as that in the mode 0. Finally, in the mode 2, the sampling is effected at every time interval corresponding to the crankshaft rotation angle of 144° because the revolution speed N in this mode 2 is four times as high as that in the mode 0. Under these conditions, data of the air flow is fetched in all the modes 0, 1 and 2 at the same effective angular position of the crankshaft, because the crankshaft rotation angle corresponding to the single suction stroke of the engine remains the same for all the modes. In this manner, by varying the timing at which the air flow data is sampled or fetched as a function of the revolution speed of the engine crankshaft, the time required for processing the data is not subjected to influences of the variations in engine speed.

Figure 23:
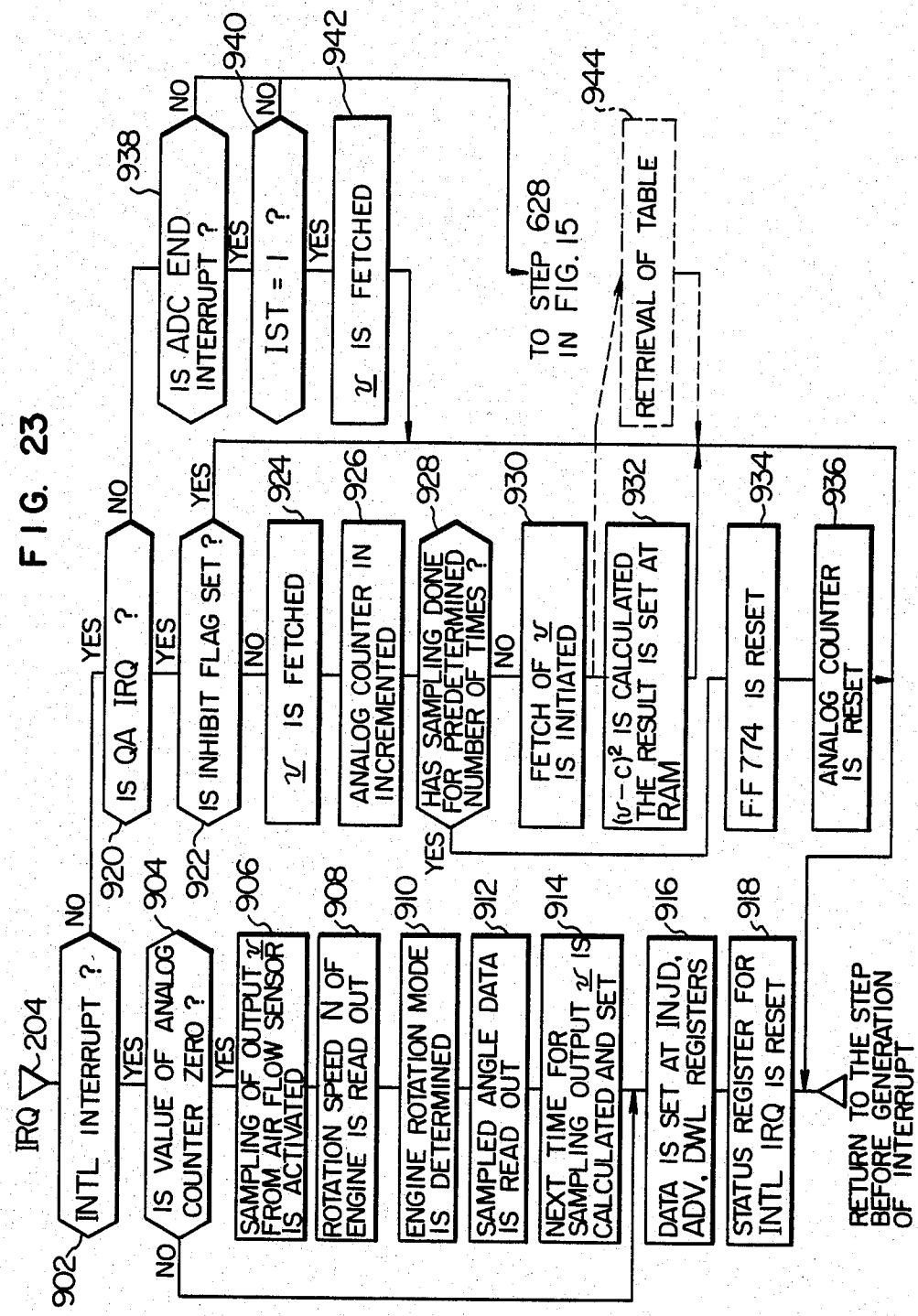
FIG. 23 is a flow chart showing a processing flow of an interrupt processing program.

FIG. 23 shows a flow chart to illustrate a processing scheme for the sampling of the signal output from the hot-wire type air flow sensor.

Figure 22:
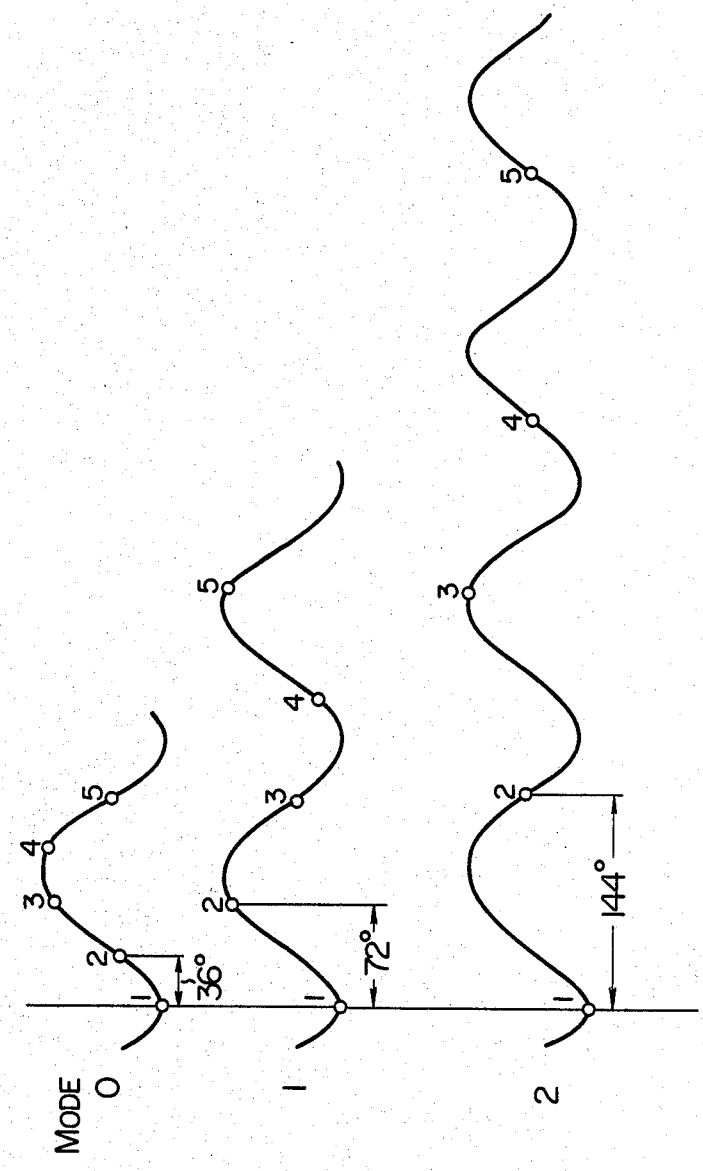
FIG. 22 is a waveform diagram showing a showing a sampling timing for detecting the output of the air-flow sensor.

Referring to the figure, when a corresponding interrupt request is issued, execution is transferred to the entry step 204 shown in FIGS. 5 and 13, whereby it is determined whether the interrupt request concerns the INTL interrupt or not at a step 902 shown in FIG. 23. When the result of decision is affirmative (YES), it is determined at a step 904 whether a software counter for managing the sampling or fetching of the signal representative of the instantaneous rate of air flow is set to zero (0) or not. The software counter is implemented in software and disposed at the address AAB3 in the RAM 106 as shown in FIG. 24. The value contained in the software counter represents one of the sampling points 1 to 5 shown in FIG. 22 at which the sampling has been performed. When the contents in the software counter equal zero, the A/D converter 128 (FIG. 4) is activated by a step 904 to prepare the initiation of the sampling of the air flow $v_1$ (FIG. 22). The sampling of the air flow $v_1$ based on this activation takes place at a step 906. At a step 908, the revolution speed N of engine crankshaft is read out from the RAM 106 at the address AAA1. An arrangement of the RAM 106 is illustrated in detail in FIG. 24. At a step 910, the mode of engine crankshaft revolution speed is determined. To this end, zero is set at the address AAB4 of the RAM 106 (FIG. 24), which is followed by a comparison of the engine speed N with a value "1600" stored in the ROM 102 at an address AAC1 (FIG. 25). When the engine speed N is greater than 1600, the mode number or value stored at the address AAC2 in the RAM 106 is incremented by +1 (plus one unit). The incremented value is then compared with the value "3200" stored in the ROM 102 at the address AAC2 shown in FIG. 25. When it is found that the engine rotation number or engine speed N is greater than the value "3200", the mode number or value contained in the RAM 106 at the address AAB4 is additionally incremented by +1. In this manner, one of the modes 0 to 2 is established. On the basis of the mode thus established at the address AAB4 of the RAM 106 (FIG. 24), data is read out from the ROM 102 at the address corresponding to the sum of the mode number as established and addresses AAC3–AAC5 of ROM 102 at a step 912. Thus, when the mode number is zero, the data read out at the step 912 corresponds to the contents stored at the address AAC3 which represents a crankshaft rotation of 36 degrees. In the mode 1, the data as read out corresponds to the contents at the address AAC4 which represents a crankshaft rotation angle of 72 degrees, while in the mode 2, the data corresponding to the one stored at the address AAC5 and representing a rotation angle of 144 degrees is read out. These crankshaft rotation angles play a role in determining the timings at which the data of air flow is sampled in the respective modes, as described hereinbefore in conjunction with FIG. 22. On the basis of the sampling angle and the engine speed N (contents stored at the address AAA1 of RAM 106 shown in FIG. 24), the sampling time point is arithmetically determined and loaded in the register 741 shown in FIG. 17, at a step 914. At the same time, the flip-flop (FF) 774 is reset, to thereby disable the AND gate 776. When the sampling time is set in this manner at the step 914, the registers INJD, ADV, and DWC are loaded with the associated data. Subsequently, the register ATATVS for INTL IRQ is reset, whereupon execution of the program for processing the INTL interrupt has been accomplished. When the count of the analog counter is found not to be zero at the step 904, a jump is made to the step 916.

On the other hand, when no INTL interrupt request is present at the step 902, it is determined at a step 920 whether the request for QA interrupt is present which is the timer interrupt for QA. If the answer is affirmative (YES), it is then determined at a step 922 whether a flag for inhibiting the sampling of the output signal from the air flow sensor is set or not. In the case where the inhibit flag is set, the program of concern executed until then is terminated. When no inhibit flag is set, the air flow rate signal v output from the air flow sensor is fetched at a step 924. At a succeeding step 926, the count of the software counter, i.e. the contents at the address AAB3 of the RAM 106 shown in FIG. 24, is incremented by +1. At a step 928, it is then determined whether the sampling of v has been completed (i.e. whether the sampling counts indicated by the software counter has attained a predetermined number of times). Upon completed sampling of the flow data v, the flip-flop 774 is set, to thereby enable the AND gate 776 for resetting the counter 742 shown in FIG. 17 at a step 936. To this end, the counter 742 is reset by the signal REF at a step 936. At a step 936, the software counter is reset.

In the case where it is found that the data fetching or signal sampling has not yet been completed at the step 928, the ADC 2 is activated for sampling the signal output from the air flow sensor. The digital value resulting from the activation of the ADC 2 is stored in the register 130 shown in FIG. 4 after having undergone the A-D conversion by the ADC 2 and thus can be fetched at the step 924.

At a step 932, a quantity $(v-c)^2$, where c represents a constant, is calculated by making use of the value v fetched at the step 924. The values resulting from the calculation of $(v-c)^2$ are sequentially set in the RAM at addresses AAA4 to AAA8 shown in FIG. 24. More specifically, the value v1 corresponding to the sampling point 1 shown in FIG. 22 is stored at the address AAA4, the value v2 corresponding to the sampling point 2 in FIG. 22 is stored at the address AAA5 and so forth. These addresses can be determined in accordance with the expression:

AAA4+(contents in the analog counter)−1.

When it is determined at the step 920 that the QA interrupt is not present, then it is determined at a step 938 whether ADC END interrupt is to be dealt with. When the result of this decision is affirmative, then a decision is made at a step 940 as to whether the flag IST (FIG. 16) is set or "1". If so, then the output signal v from the air flow sensor is fetched at a step 942. This sensor output signal v is utilized for starting the engine without the aid of the starter. When no ADC END interrupt is detected at the step 938, or whein the flag IST is not set (i.e. not "1") at the step 940, the processing for the INTV interrupt is executed starting from the step 628 shown in FIG. 15.

Figure 26:
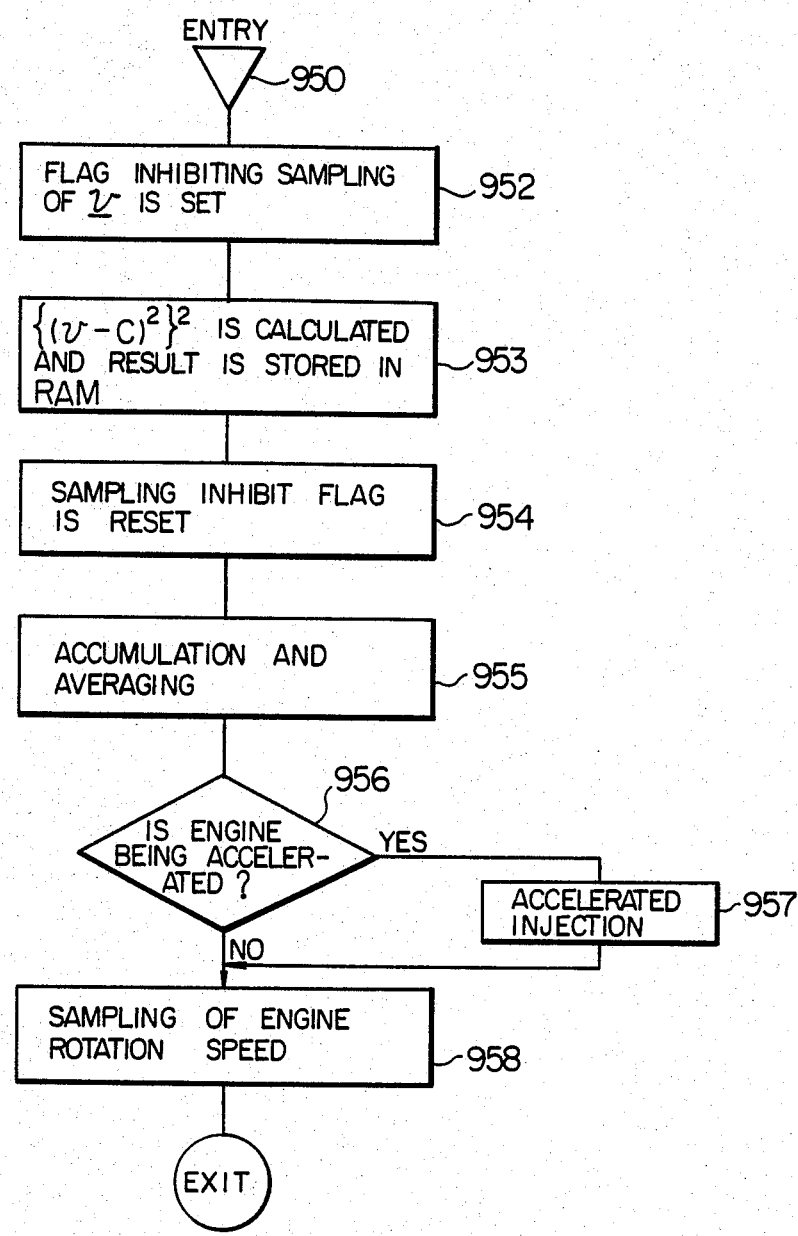
FIG. 26 is a flow chart illustrating the program ADIN 2.

Next, referring to FIG. 26, description will be presented of the task concerning the air flow signal processing (AC) 610 shown in FIG. 13. The task for processing the air flow signal is activated at a step 950, as can be seen from the figure. Upon activation of the task, the flag for inhibiting the fetching of the signal v output from the air flow sensor is set. At a succeeding step 953, $\{(v-c)^2\}^2$ is calculated. The results of the calculation are sequentially stored at the addresses AAA9 to AAAD in RAM 106 shown in FIG. 24. A step 954, the flag to inhibit the fetching is reset. Next, at a step 955, the values obtained from the calculation of $\{(v-c)^2\}^2$ and stored in the RAM 106 are added together and averaged. The averaged value represents the quantity of air supplied to the engine. This air quantity is designated by QA. It is then determined at a step 956 whether the engine is in the acceleration mode or not. If the result of the decision at the step 956 is affirmative (YES), a correspondingly accelerated fuel injection is effected at a step 957. When it is determined at the step 956 that the engine is not in the accelerating state, the engine rotation speed is sampled at a step 958. To this end, the measurement of the engine rotation speed is effected by the circuit 126 shown in FIG. 4. This circuit 126 includes a counter for counting the POS output pulses derived from the ANGL sensor 53 for a predetermined time. This count value represents the rotation speed of the engine. The data of the engine rotation speed N is stored at the address AAA1 of the RAM 106 shown in FIG. 24. Alternatively, in place of the execution of the steps 932 (FIG. 23) and 953 (FIG. 26), the result of the calculation may be stored in the ROM and read out at the step 944.

Figure 27:
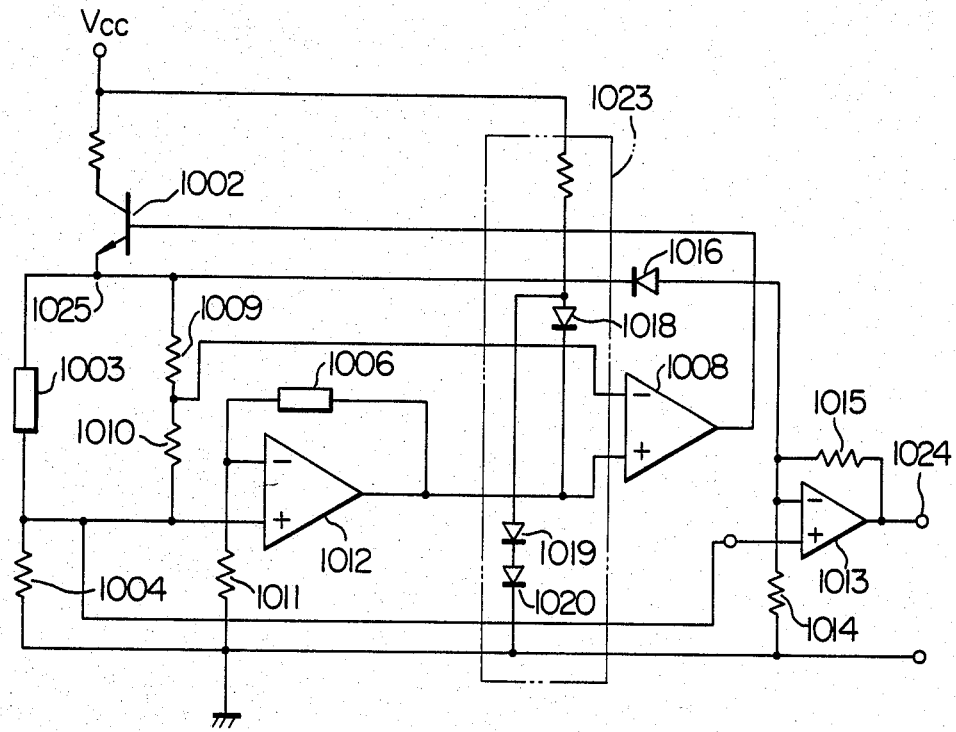
FIG. 27 is a block diagram showing an examplary embodiment of the air flow sensor.

FIG. 27 shows in detail a circuit arrangement of the air flow sensor shown in FIG. 4.

The thermo-sensitive resistors 1003 and 1006 are made of the same material, for example, platinum, with a temperature coefficient α. The thermo-sensitive resistor 1006 is placed in the bypath 22 to detect the temperature of the fluid (intake air).

The operation of the start circuit 1023 is as follows. When a power source is turned on, the amplifier 1008 is forced to temporarily produce an output signal and, in turn, to turn on the transistor 1002, to thereby actuate the circuit shown in FIG. 27. When the power source is not turned on, the transistor 1002 is in the OFF state and the output signals from the operational amplifiers 1008 and 1012 are zero. When the power source is turned on, the power source voltage $V_{cc}$ is applied to the collector of the transistor 1002 and the circuit 1023. Since the diodes 1018 and 1020 have each a forward voltage drop $V_d$, the anode potential of the diode 1018 becomes 2 $V_d$ so that the potential at the non-inverted input of the operational amplifier 1008 becomes 1 $V_d$ since the forward voltage drop of the diode 1018 is $V_d$. At this time, the potential of the inverted input terminal of the amplifier 1008 is 0, so that the output signal from the operational amplifier 1008 is high in level and the transistor 1002 becomes conductive. When the circuit including the thermo-sensitive resistors 1002 and 1006 becomes balanced, the voltage at the inverted and the non-inverted input terminals of the operational amplifier 1008 are both higher than the forward voltage drop $V_d$ across the diode so that the diode 1018 is inversely biased and the start circuit 1023 is electrically disconnected from the operational amplifier 1008.

When a PNP transistor is used in place of the NPN transistor 1002 shown in FIG. 27, the cathode of the diode 1018 should be connected to the inverted input of the operational amplifier 1008 in place of the non-inverted input thereof.

Upon conduction of the transistor 1002 triggered by the start circuit, the emitter current of the transistor 1002 flows into the series circuit having the resistors 1003 and 1004 and into the voltage divider including resistors 1009 and 1010. Assume now that the resistances of the resistors 1003, 1004, 1006, 1009, 1010 and 1011 are respectively denoted as R3, R4, R6, R9, R10 and R11, a voltage drop across the resistor 1004 as V4 and a voltage drop across the resistor 1003 as V3. The operational amplifier 1012 compares the input potentials at the inverted and the non-inverted input terminals, that is to say, a potential at the node between the resistors 1003 and 1004 and a potential at the node between the resistors 1006 and 1011, and controls its output potential so that those input potentials are equal to each other. The output potential of the operational amplifier 1012 becomes $V4+R6/R11 \times V4$. The operational amplifier 1008 controls the base voltage of the transistor 1002 so that the potential at the node between the resistors 1009 and 1010, or the divided voltage across the resistor 1003 $\{V4+R10\times V3/(R9+R10)\}$, and the potential at the output of the operational amplifier 1012 are equal to each other. Note here that the amplifier 1008 does not effect the control so as to make the voltage across the resistor 1003 equal to that across the resistor 1006, but compares the divided voltage across the thermosensitive resistor 1003 with the voltage across the thermo-sensitive resistor 1006 and effects the control so as to make those voltages equal to each other. Consequently, the voltage across the resistor 1006 may be selected to be much smaller than that across the resistor 1003. The output of the FIG. 27 circuit when a balanced condition is maintained will be obtained as follows. Assume now that the sum of the resistances of the resistors 1009 and 1010 is selected to be much larger than the resistance value of the thermosensitive resistor 1003. The resistances of the thermosensitive resistors 1003 and 1006 are given by $$R3 = R30\,(1+\alpha T3) \tag{1}$$

$$R6 = R60\,(1+\alpha T6) \tag{2}$$

where

R30: resistance of the resistor 1003 at a reference temperature

R60: resistance of the resistor 1006 at a reference temperature

T3: surface temperature of the resistor 1003

T6: surface temperature of the resistor 1006

The condition for balancing the circuit of FIG. 27 is given by $$R4 \times R6 = k \times R11 \times R3 \tag{3}$$

where $k = R10/(R9+R10)$.

Substituting the equations (1) and (2) into the equation (3), we have $$T3 - T6 = \Delta T = 1/\alpha \times (1 + k \times R11 \cdot R30/R4 \cdot R60)(-1 + \alpha T3) \tag{4}$$

The relation between a heat quantity, generated by heater resistor placed in fluid and that carried away by the fluid is expressed as follows:

$$Q = I^2 R3 = (C1 + C2\sqrt{q_{am}}) \cdot \Delta T \tag{5}$$

where

I: current flowing through the resistor 1003, C1 and C2 being constants, $q_{am}$: mass air flow rate, Q: heat quantity generated by the resistor 1003

From the equations (1) and (5), we have $$Q = I^2 R30\,(1 + \alpha Te) = (C1 + C2\sqrt{q_{am}})\Delta T \tag{6}$$

From the equations (4) and (6), we also have $$Q = I^2 R30\,(1 + \alpha T3) \tag{7}$$
$$= 1/\alpha \times (C1 + C2\sqrt{q_{am}})(1 - k \times R11 \cdot R30/R4 \cdot R60) \times$$
$$(1 + \alpha T3)$$

Therefore, $$I^2 = 1/R30 \times (C1 + C2\sqrt{q_{am}})(1 - k \times R11 \cdot R30/R4 \cdot R60) \tag{8}$$
$$= k\,(C1 + C2\sqrt{q_{am}})$$

where $k = 1/R30 \times (1 - k \times R11 \cdot R30/R4 \cdot R60) =$ a constant. As can be seen from the equation (4), a temperature difference $\Delta T$ is the function of only T3 and therefore there is no need for adjusting the values of the circuit components. Such a temperature difference $\Delta T$ satisfies the equation (8), so that the current flowing through the thermo-sensitive resistor 1003 is a function including only the air flow rate $q_{am}$. Accordingly, in the balanced condition of the circuit, the currents flowing through the thermo-resistor 1003 and the resistor 1004 are equal to each other. Therefore, the flow rate of fluid is obtainable by measuring the voltage across the resistor R4. In other words, a voltage representative of the voltage across the resistor 1004 in the embodiment is produced through the operational amplifier 1013. Since the resistors 1014 and 1015 are so selected that the amplification factor of the operational amplifier 1013 is 1, the voltage v at the output terminal 1024 of the operational amplifier 1013 is as follows.

$$v = IR4 = R4\sqrt{k(C1 + C2\sqrt{q_{am}})} \tag{9}$$

The equation (9) indicates the voltage v is a function of the flow rate. Therefore, $q_{am}$ is a function of the voltage v. The ratio of the voltages V3 to V6 across the thermosensitive resistors 1003 and 1006 is $$V3/V6 = R3 \cdot R11/R6 \cdot R4 \tag{10}$$

When the resistances of the thermo-sensitive resistors 1003 and 1006 are equal to each other, the ratio is $$V3/V6 = R11/R4 \tag{11}$$

The equation (11) implies that, if the resistance of the resistor 1011 is selected to be considerably larger than that of the resistor 1004, a voltage applied to the thermo-sensitive resistor 1006 may be selected to be far smaller than that applied to the thermo-sensitive resistor 1003. Therefore, the thermo-sensitive resistor 1006 is not heated by itself, so that the temperature of the fluid may be measured with a high accuracy, and thus a correct temperature compensation for a fluid temperature variation is ensured. Furthermore, since the current flowing through the thermo-sensitive resistor 1003 is permitted to be set large, the sensitivity for the air flow rate is good, so that, when the circuit shown in FIG. 27 is mounted in an automobile, good sensitivity is secured although the voltage of the battery is low, 12 V. Moreover, since the circuit according to the invention permits the same resistors to be used for the thermo-sensitive resistors, the accuracy of the measurement is improved, together with economical efficiency and productivity.

The operation of the Zener diode 1016 is as follows. When the circuit in FIG. 27 operates in a normal condition, the voltage across the series circuit including the thermo-sensitive resistor 1003 and the resistor 1004 i.e. the potential at the terminal 1025, and the terminal voltage across the resistor 1004, i.e. the potential at the non-inverted input terminal of the operational amplifier 1012, change proportionally to each othwer. When the thermo-sensitive resistor 1003 is disconnected or the transistor 1002 becomes conductive, however, the proportionality of the voltage change is altered, and a large current flows into the resistors 1009, 1010 and 1004 and the voltage across the resistor 1004 also increases. At this time, the potential at the terminal 1025 rises to the break-over voltage of the Zener diode 1016, so that the Zener diode conducts, and the potential at the inverted input terminal of the operational amplifier 1013 increases. As a result, the output voltage of the operational amplifier decreases and it indicates that the air flow rate is zero or approximates zero. Therefore, erroneous fuel injection is prevented, that is to say, a situation where the fuel injector 12 erroneously ejects an excessive amount of fuel, or where an excessive current flows into the thermo-sensitive resistor 1003 to be exessively heated, being attended with an accident such as fire is avoided.

What is claimed is:

1. A method of controlling an internal combustion engine system which comprises an internal combustion engine in which an air-fuel mixture prepared from air introduced through an intake air passage and fuel fed from fuel supply means is subjected to combustion to produce thermal energy which is converted into mechanical energy for rotating an output shaft of said engine, while exhaust gas resulting from the combustion is discharged through an exhaust gas passage; an air flow sensor for producing an output signal representative of the state of intake air flow within said intake air passage of said engine; and an arithmetic circuit for producing a control signal for driving said fuel supply means in dependence on the output signal from said air flow sensor;

said method comprising the steps of:
arithmetically determining the quantity of air charged to said engine on the basis of the output signal from said air flow sensor;
generating said control signal on the basis of the result of said arithmetic determination;
driving said fuel supply means in dependence on said control signal;
wherein said step of arithmetically determining the air quantity charged to said engine comprises:
a first step of generating data representative of a sensor signal sampling timing for sampling the output signal from said air flow sensor in synchronism with pulsation of the air flow fed to said engine;
a second step of producing a timing signal for sampling said sensor output signal on the basis of said data representative of the timing for sampling sensor output signal;
a third step of sampling the output signal from said air flow sensor in accordance with said timing signal produced at said second step; and
a fourth step of determining the intake air quantity on the basis of a number of the signal values sampled at said third step.

2. A method of controlling an internal combustion engine according to claim 1, wherein said first step comprises;
a fifth step of detecting a rotation speed of said output shaft of said engine;
a sixth step of producing said timing destined for sampling the output signal from said air flow sensor in terms of data represented by a rotation angle of said output shaft of the engine in accordance with the rotation speed of said output shaft detected at said fifth step;
whereby said timing signal is produced at said second step when said output shaft has been rotated from a reference position by said rotation angle derived at said sixth step.

3. A method of controlling an internal combustion engine according to claim 1, wherein said arithmetic circuit includes a memory in which data representing the timing for sampling the output signal from said air flow sensor are stored at locations corresponding to a number of speed ranges which are defined by correspondingly dividing a whole range in which the rotation speed of said output shaft of the engine may be varied;
said first step further including:
a fifth step of detecting the rotation speed of said output shaft of the engine; and
a sixth step for determining the speed range within which said rotation speed of said output shaft of the engine detected at said fifth step falls and reading out from said memory the sampling timing data corresponding to said determined speed range,
whereby said timing signal is produced at said second step when said output shaft has been rotated from a reference position by said rotation angle derive at said sixth step.

4. A method of controlling an internal combustion engine according to claim 3, wherein said first step further comprises a seventh step of converting the sampling timing data derived at said sixth step into data representing a time duration by making use of the rotation angle of said output shaft of the engine,
said second step including an eighth step of producing the timing signal when the time represented by the data obtained at said seventh step has elapsed starting from said reference position of said output shaft of the engine.

5. A method of controlling an internal combustion engine according to claim 3, wherein said fourth step comprises a seventh step of arithmetically determining instantaneous intake air quantities on the basis of the output signal from said air flow sensor as sampled at said third step; and
an eighth step for averaging said instantaneous intake air quantities.

6. A method of controlling an internal combustion engine according to claim 1, wherein said arithmetic circuit further includes a circuit for generating a first interrupt signal in response to said reference position during rotation of said output shaft of the engine; and an interval interrupt signal generating circuit for generating a second interval signal every time when a predetermined time has elapsed; and
wherein said step for arithmetically determining the intake air quantity to be charged to said engine on the basis of the output signal from said air flow sensor is initiated in synchronism with said interrupt signal; and said step for preparing said control signal is initiated in synchronism with said second interrupt signal.

7. A method of controlling an internal combustion engine system having an internal combustion engine in which an air-fuel mixture prepared from air introduced through an intake air passage and fuel fed from fuel supply means is subjected to·combustion by air-fuel mixture ignition means to produce thermal energy which is converted into mechanical energy for rotating an output shaft of said engine, while exhaust gas resulting from the combustion of fuel is discharged through an exhaust gas passage, an air flow sensor for producing an output signal representative of the state of intake air flow within said intake air passage of said engine, which signal varies in synchronism with the rotation of the output shaft of said engine, and a signal processing device for producing a control signal for driving said fuel supply means and said air-fuel mixture ignition means in response to an interrupt signal and in accordance with the output signal from said air flow sensor, said method comprising the the steps of:

(a) sampling the output signal produced by said air flow sensor a plurality of times for the generation of each interrupt signal and in synchronization with the variation of said intake air flow, so as to be in synchronization with the angle of rotation and dependent upon the rate of rotation of said output shaft, (b) supplying a prescribed plurality of data representative of the plurality of samples of the output signal sampled in step (a) to said signal processing device, and (c) producing said control signal in accordance with the average value of said prescribed plurality of data representative of said plurality of said samples of said output signal supplied in step (b), whereby said control signal for driving said fuel supply means and said air-fuel mixture ignition means is produced in accordance therewith.

8. A method according to claim 7, wherein step (a) comprises sampling the output signal produced by said air flow sensor in synchronization with the variation of said intake air flow.

9. A method according to claim 7, wherein step (a) comprises sampling the output signal produced by said air flow sensor in synchronization with the angle of rotation and dependent upon the rate of rotation of said output shaft.

10. A method according to claim 7, wherein step (a) comprises sampling the output signal produced by said air flow sensor in synchronization with the variation of said intake air flow and dependent upon the rate of rotation of said output shaft.

11. A method according to claim 7, wherein step (a) comprises sampling the output signal produced by said air flow sensor in synchronization with the variation of said intake air flow at sampling intervals related to the rotation of said output shaft.

12. A method according to claim 11, wherein step (a) comprises sampling the output signal produced by said air flow sensor in synchronization with the variation of said intake air flow at respective intervals of rotation of said output shaft established in accordance with the speed of rotation of said output shaft.

13. A method according to claim 12, wherein said respective intervals of rotation of said output shaft are associated with respective ranges of speed of rotation of said output shaft.

14. A method according to claim 13, wherein said respective intervals of rotation of said output shaft increase with respectively higher ranges of speed of rotation of said output shaft.

15. A method according to claim 7, wherein step (c) comprises performing algebraic calculations in accordance with each of said samples of said output signal supplied in step (b) and storing the results of said calculations in memory, and generating said control signal in accordance with an average of the results of said algebraic calculations.

16. A method according to claim 13, wherein, in response to a change in speed of rotation of said output shaft from one range to another, step (a) comprises changing the interval between samplings of the output produced by said air flow sensor.

17. A method according to claim 16, wherein step (a) comprises changing the interval between said samplings at a preselected point of the variation of said intake air flow irrespective of the point of the variation of said intake air flow at which there occurs a change in the speed of rotation of said output shaft from one range to another.

18. A method according to claim 16, wherein step (a) comprises changing the interval between said samplings at a preselected sampling point of the variation of said intake air flow irrespective of the point of the variation of said intake air flow at which there occurs a change in the speed of rotation of said output shaft from one range to another.

19. A method according to claim 7, wherein said air flow sensor comprises a hot-wire flow rate measuring apparatus having:

a first series circuit including a first thermo-sensitive resistive element placed in a fluid path of air introduced through said intake air passage and a first resistive element, a circuit for dividing the voltage across said first thermo-sensitive resistive element;

a second thermo-sensitive resistor for temperature compensation placed in said fluid path of air;

means for detecting the difference between the output voltage of said voltage dividing circuit and the output voltage of said second thermo-sensitive resistor for temperature compensation;

means for detecting the difference between the output voltage of said voltage dividing circuit and the output voltage of said second thermo-sensitive resistor for temperature compensation;

means for controlling current fed to said first series circuit in accordance with the detected voltage from said detecting means; and output means for producing a voltage in accordance with the voltage across said resistive element, and wherein the output voltage of said output means indicates a flow rate of fluid, and further comprising a second resistive element connected in series with said second thermo-sensitive resistive element to form a second series circuit therewith; and means for controlling the voltage across said second series circuit so that the voltage across said first resistive element and the voltage across said second resistive element are equal to each other, and wherein the voltage across said second series circuit is applied to said detecting means as said output voltage across said thermo-sensitive resistive element for temperature compensation.

20. A method according to claim 19, wherein said control means is an amplifier and said thermo-sensitive resistive element is inserted in the feedback circuit of said amplifier.

21. A method according to claim 19, wherein said hot-wire flow rate measuring apparatus further comprises a constant voltage element connected at one end to said current feeding means, and wherein said output means includes an amplifier coupled at the non-inverted input terminal with said first resistive element, and at the inverted input terminal with the other terminal of said constant voltage element, and provides the sensor output signal as said output voltage.

22. A method according to claim 19, wherein the temperature coefficients of said first thermo-sensitive resistive element and said second thermo-sensitive resistive element are equal to each other.

23. A method according to claim 19, wherein said voltage dividing circuit is comprised of serially connected resistors and said detecting means is an amplifier.

24. A method according to claim 7, wherein said air flow sensor comprises a hot-wire flow rate measuring apparatus having:
 a first series circuit including a first thermo-sensitive resistive element and a first resistor element;
 a second series circuit including a second thermo-sensitive resistive element and a second resistor element;
 a first amplifier circuit having an input and an output; and
 a second amplifier circuit having an input and an output; and wherein
 an input of said second amplifier circuit is coupled to the output of said first amplifier circuit and the output of said second amplifier circuit is coupled to control the current supplied to said first series circuit, and
 one of said first and second series circuits is coupled to an input of said first amplifier circuit and the other of said first and second series circuits is coupled to an input of said second amplifier circuit.

25. A method according to claim 24, wherein one end of said first thermo-sensitive resistive element is coupled to an input of said first amplifier circuit and one end of said second thermo-sensitive resistive element is coupled to an input of said second amplifier circuit.

26. A method according to claim 24, wherein said first amplifier circuit has a first input coupled to the connection of said first thermo-sensitive resistive element and said first resistor element and a second input coupled to the connection of said second thermo-sensitive resistive element and said second resistor element.

27. A method according to claim 24, wherein one of said first and second thermo-sensitive resistive elements is adapted to measure fluid flow rate and the other of said first and second thermo-sensitive resistive elements is a temperature compensation resistive element.

28. A method according to claim 24, further comprising a voltage divider circuit coupled in parallel with said first thermo-sensitive resistive element, and means for coupling the output of said voltage divider circuit to an input of said second amplifier circuit.

29. A method according to claim 26, wherein said first amplifier circuit has a non-inverted input coupled to the connection of said first thermo-sensitive element and said first resistor element and an inverted input coupled to the connection of said second thermo-sensitive resistive element and said second resistor element.

30. A method according to claim 24, further including means, responsive to the output of said second amplifier circuit, for controlling the current supplied to said first series circuit.

31. A method according to claim 24, wherein the temperature coefficients of said first and second thermo-sensitive resistive elements are equal to each other.

32. A method according to claim 24, wherein one of said first and second thermo-sensitive resistive elements is coupled between an input and an output of one of said first and second amplifier circuits.

33. A method according to claim 24, wherein said second thermo-sensitive resistive element is connected between the input and output of said first amplifier circuit.

34. A method according to claim 27, wherein said first thermo-sensitive resistive element is adapted to measure air flow rate and said second thermo-sensitive resistive element is a temperature compensation resistive element.

35. A method according to claim 34, wherein one end of said temperature compensation resistive element is coupled to an input of said first amplifier circuit.

36. A method according to claim 35, wherein another end of said temperature compensation resistive element is coupled to an input of said second amplifier circuit.

37. A method according to claim 24, further comprising an output circuit having an input coupled to said first series circuit and an output from which an output signal representative of intake air flow rate is derived.

38. A method according to claim 28, wherein said first thermo-sensitive resistive element is adapted to measure intake air flow rate and said second thermo-sensitive resistive element is a temperature compensation resistive element.

39. A method according to claim 38, further comprising an output circuit having an input coupled to said first series circuit and an output from which an output signal representative of intake air flow rate is derived.

40. A method according to claim 39, further comprising means, coupled to said first series circuit and said output circuit, for causing said output signal to indicate that the detected intake air flow rate is low in response to misoperation of said first thermo-sensitive resistive element.

41. A method according to one of claims 24 and 28, wherein the resistance value of said second thermo-sensitive resistive element is considerably less than that of said second resistor element.

42. A method according to claim 30, wherein said hot-wire flow rate measuring apparatus further comprises activation means, coupled to an input of said second amplifier circuit and responsive to the application of power to said apparatus, for causing said control means to initiate the supply of current to said first series circuit.

43. A method according to claim 42, wherein said activation means comprises means for imparting a bias imbalance to said second amplifier circuit in response to the application of power to said apparatus, whereby said second amplifier circuit couples an output to cause said control means to initiate the supply of current to said first series circuit.

44. A method according to claim 43, wherein said activation means comprises means for removing said bias imbalance to said second amplifier circuit subsequent to the initiation of the supply of current to said first series circuit.

45. A method according to claim 44, wherein said activation means comprises a diode bias circuit, coupled between a voltage supply source and an input of said second amplifier circuit.

\* \* \* \* \*